(12) United States Patent
Cushing et al.

(10) Patent No.: US 7,945,575 B2
(45) Date of Patent: May 17, 2011

(54) METHOD OF TRANSFORMING QUERIES BASED UPON E/R SCHEMA INTO MULTI-DIMENSIONAL EXPRESSION QUERIES

(75) Inventors: David Cushing, Osgoode (CA); Marius Cosma, Kanata (CA); Neil Warner, Orleans (CA); Helmut Beffert, Chelsea (CA)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/855,255

(22) Filed: May 27, 2004

(65) Prior Publication Data

US 2005/0010565 A1    Jan. 13, 2005

(30) Foreign Application Priority Data

May 27, 2003    (CA) .................................... 2429909

(51) Int. Cl.
*G06F 17/30*    (2006.01)
(52) U.S. Cl. ........................ 707/760; 707/761; 707/765
(58) Field of Classification Search .............. 707/1–10, 707/100–104.1, 760, 761, 765
See application file for complete search history.

(56) References Cited

U.S. PATENT DOCUMENTS

| | | | | |
|---|---|---|---|---|
| 5,555,403 A | * | 9/1996 | Cambot et al. .................... 707/4 |
| 5,675,785 A | * | 10/1997 | Hall et al. ..................... 707/102 |
| 5,701,466 A | | 12/1997 | Young et al. |
| 6,609,123 B1 | * | 8/2003 | Cazemier et al. ................ 707/4 |
| 7,007,029 B1 | * | 2/2006 | Chen ............................ 707/100 |
| 2002/0059195 A1 | | 5/2002 | Cras et al. |
| 2002/0091681 A1 | * | 7/2002 | Cras et al. ........................ 707/3 |
| 2003/0101170 A1 | * | 5/2003 | Edelstein et al. ................ 707/3 |
| 2005/0010566 A1 | | 1/2005 | Cushing et al. |

FOREIGN PATENT DOCUMENTS

| | | |
|---|---|---|
| EP | 0 706 140 A | 4/1996 |
| EP | 1 081 611 A | 3/2001 |

OTHER PUBLICATIONS

SAS Institute, Incorporated; "Accessing OLE DB for OLAP Data" [Online], Jul. 8, 2001, XP002377044; Retrieved from the Internet: URL: http://web/archive.org/web/20010708180424/http://www.uc.edu/sashtml/accdb/z1259346.htm> [retrieved on Apr. 13, 2006].
Antony Luxton; "MS Access" [Online], Jul. 6, 2001, XP002377045, Retrieved from the Internet: URL: http://busxt01.carleton.ca/2400_w_2003/antony_access/access/Default.htm#reports>[retrieved on Apr. 12, 2006].

(Continued)

*Primary Examiner* — Tim T. Vo
*Assistant Examiner* — Sangwoo Ahn
(74) *Attorney, Agent, or Firm* — Patterson & Sheridan, LLP

(57) ABSTRACT

A method of transforming queries based upon an entity/relationship schema into multi-dimensional expression queries is provided. The method comprises matching an object referenced in an entity/relationship schema based report specification to a corresponding object in the entity/relationship schema, the corresponding object adorned with associated multidimensional metadata; adding the associated multi-dimensional metadata to the object referenced in the entity/relationship schema based report specification; translating the entity/relationship schema based report specification into a multi-dimensional expression query; and retrieving directly all data required to populate a report output of the entity/relationship schema report specification.

13 Claims, 11 Drawing Sheets

OTHER PUBLICATIONS

William Pearson; "Reporting Options for Analysis Services Cubes: MS Excel 2002"; Database Journal, Apr. 7, 2003, XP002376434.
Non-Final Office Action for U.S. Appl. No. 10/855,818, dated Jan. 8, 2007.
Final Office Action for U.S. Appl. No. 10/855,818, dated Aug. 21, 2007.
Non-Final Office Action for U.S. Appl. No. 10/855,818, dated Mar. 19, 2008.
Final Office Action for U.S. Appl. No. 10/855,818, dated Oct. 14, 2008.
EP Examination Report for Application No. 04-102363.1, dated Feb. 26, 2010.
Thomas Ruf, et al. "Dealing With Complex Reports in OLAP Applications," Lecture Notes in Computer Science, Springer Verlag, DE, vol. 1676, (Jan. 1, 1999) 14 pages.
Office Action History of U.S. Appl. No. 10/855,818 dated from Dec. 31, 2008 to Aug. 19, 2009.

* cited by examiner

METHOD OF TRANSFORMING QUERIES BASED UPON E/R SCHEMA INTO MULTI-DIMENSIONAL EXPRESSION QUERIES

FIELD OF THE INVENTION

The invention relates to a system and method of transforming queries based upon E/R schema into multi-dimensional expression queries.

BACKGROUND OF THE INVENTION

Data warehouses store data in one of two primary locations—relational databases and multi-dimensional, on-line analytical processing (OLAP) data sources. Typically, reporting tools that generate tabular/grouped list, or cross-tabulated reports work with relational databases, or extract data from an OLAP data source and process the data locally. This sort of product architecture is imposed due to the semantic differences between the relational and OLAP data models and the query languages used to access each type of data source. Whereas the relational query language, SQL, is well suited to producing tabular and grouped-list reports, multi-dimensional query languages are more suited to producing cross-tabulated reports for the purpose of analysis and exploration.

Processing OLAP data locally to provide the data for a particular report introduces several less than ideal side effects, including:
- the aggregation capabilities of the OLAP engine are not invoked.
- complex aggregation/calculation rules defined in an OLAP data source are lost.
- calculating values locally may require the retrieval of large amounts of data
- if data is retrieved and processed locally, it is possible that security rules in the OLAP engine are not enforced.

Authoring tabular and cross-tabulated reports based upon OLAP (dimensional) metadata is problematic as well since it introduces concepts not apparent in more common tabular/relational data sources. These concepts include dimensions, hierarchies, levels, properties, and measures.

From the end user's point of view, it is desirable to deal with the more familiar entity/relationship (or the relational) concepts of entities (tables), attributes (columns), and relationships loins) instead of the more complex dimensional constructs. The entity/relationship model provides a simpler and easier to understand paradigm, as well as consistency in representation regardless of the type of underlying data source.

SUMMARY OF THE INVENTION

It is an object of the present invention to solve one or more of the problems described above.

In accordance with an embodiment of the present invention, there is provided a system for transforming queries based upon entity/relationship schema into multi-dimensional expression queries. The system comprises a binding module for matching an object reference in a report specification to a corresponding entity/relationship schema object and adding associated multi-dimensional metadata information from the entity/relationship schema to a corresponding report specification object, and a query translation module for translating the report specification into a single multi-dimensional query.

In accordance with another embodiment of the present invention, there is provided a method of transforming queries based upon entity/relationship schema into multi-dimensional expression queries. The method comprises the steps of analyzing a query based upon an entity/relationship schema, generating translations of the entity/relationship schema to dimensional expressions, and generating a multi-dimensional query based upon the translations.

In accordance with another embodiment of the present invention, there is provided a computer data signal embodied in a carrier wave and representing sequences of instructions which, when executed by a processor, cause the processor to perform a method of transforming queries based upon entity/relationship schema into multi-dimensional expression queries. The method comprises the steps of analyzing a query based upon an entity/relationship schema, generating translations of the entity/relationship schema to dimensional expressions, and generating a multi-dimensional query based upon the translations.

In accordance with another embodiment of the present invention, there is provided a computer-readable medium having computer readable code embodied therein for use in the execution in a computer of a method of transforming queries based upon entity/relationship schema into multi-dimensional expression queries. The method comprises the steps of analyzing a query based upon an entity/relationship schema, generating translations of the entity/relationship schema to dimensional expressions, and generating a multi-dimensional query based upon the translations.

In accordance with another embodiment of the present invention, there is provided a system for transforming queries based upon entity/relationship schema into multi-dimensional expression queries. The system comprises a binding module for matching an object reference in a report specification to a corresponding entity/relationship schema object and adding associated multi-dimensional metadata information from the entity/relationship schema to a corresponding report specification object, and a query translation module for translating the report specification into a single multi-dimensional query.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 1:
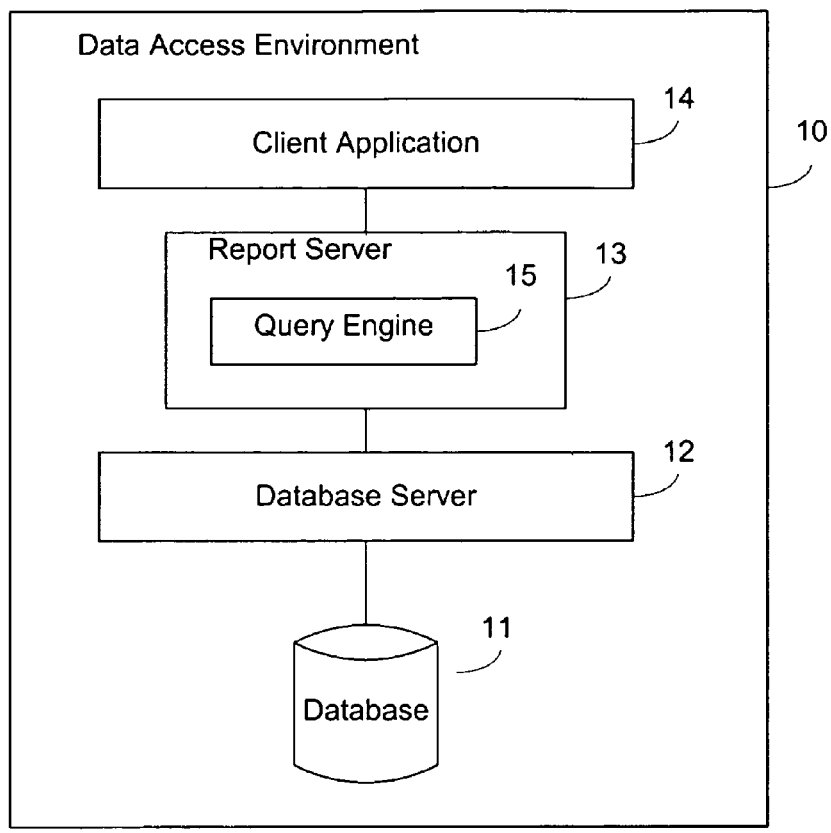
FIG. 1 shows an example of a typical data access environment.

FIG. 1 shows a typical data access environment 10 for processing data. Typically, data is stored in a database 11. A database server 12, e.g., structured query language (SQL) server, accesses the raw data stored in the database 11. A report server 12 is used to generate reports on the raw data and instruct the database server 12 to obtain information pertaining to the raw data in the database 11. An end user uses a client application 14, running on a client server, to facilitate report server 13 operations. Typically, a report server 13 has a query engine 15 for universal data access (UDA).

One embodiment of the present invention provides a manner in which tabular and cross-tabulated reports may be executed using an online analytical programming (OLAP) query language using an entity/relationship (E/R) representation of the OLAP metadata without the necessity of local processing, thus obtaining the benefit of the OLAP aggregation engine, the data source's complex aggregation rules, and minimal data transfer from the OLAP data source to the client reporting application. In addition, a mechanism may be provided by which the results of the OLAP query are processed such that their format and contents accurately reflect the semantics of the original report specification.

Figure 2:
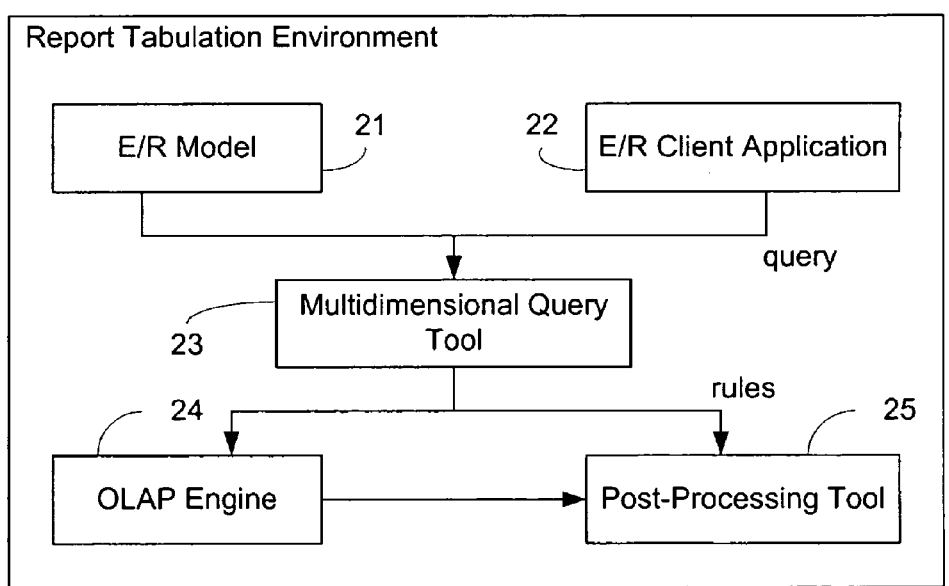
FIG. 2 shows a report tabulation environment, in accordance with an embodiment of the present invention.

FIG. 2 shows a report tabulation environment 20, in accordance with an embodiment of the present invention. The report tabulation environment 20 includes an E/R model 21, an E/R client application 22, a multidimensional query tool 23, an OLAP engine 24, and a post-processing tool 25. A report/query is generated from the E/R client application 22. The report is requested based upon the schema of the E/R model 21. However, the data (not shown) is stored in an OLAP format and is processed by the OLAP engine 24. The multidimensional query tool 23 receives the query from the E/R client application 22 and the E/R schema E/R model 21. The query is then converted into a multi-dimensional expression query that can be executed by the OLAP engine 24. The post-processing tool 25 processes the results of the multi-dimensional expression query execution.

Figure 3:
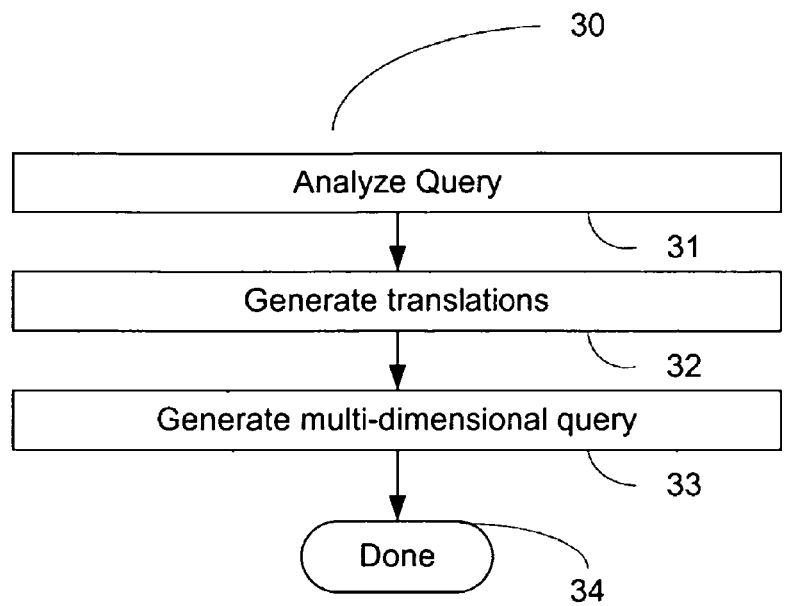
FIG. 3 shows a flowchart of an example of a method of transformation of queries based upon entity/relationship schema into multi-dimensional expression queries.

FIG. 3 shows a flowchart of an example of a method of transforming queries based upon an E/R schema into multi-dimensional expression queries (30). First, a query based upon an E/R schema is analyzed (31). Next, translations to dimensional expressions are generated (32). Finally, a multi-dimensional query is generated (33). The method is done (34). Other steps may be added to the method, including presenting the results in a format of the original query.

Tabular and cross-tabulated reports have characteristics that are independent of the manner in which they are produced and are described below.

Layout.
   The order in which columns appear in a tabular report. In a cross tabulated report, this also includes the edge of the cross tab on which columns appear.

Sorting.
   Rows can be sorted by columns, the left-most columns sorting first, following in a left-to-right nesting of sorts. Columns may be sorted in either ascending or descending order.

Calculations.
   A calculation is expressions evaluated during the execution of the report and, once defined, have the same semantics as an attribute defined in the E/R schema.

Filters.
   Filters are conditional expressions used to refine/restrict the data appearing in a report.

Grouping.
   Grouping based on attributes within a report places the data into a hierarchy of levels and introduces aggregation of fact values at different levels of summarization.

Association.
   When grouping data, some attributes may not form the basis of grouping, but are associated with a grouping attribute. This affects the manner in which these values are rendered and possibly the manner in which the values of such attributes are returned, i.e., once per group as opposed to once for each value (row) within a group.

Dimensionality.
   Grouping and association are functionally equivalent to the definition of a single hierarchy within a single dimension. An extension of this is the definition of multiple such definitions, that is, the definition of two or more dimensional hierarchies for use within a single report.

Aggregation.
   This defines the way in which individual facts are aggregated. Aggregation may be defined for a fact to be performed before or after the application of filters.

Summary values.
   An indication of whether or not facts should be summarized for a grouping of columns. Summary values may appear as headers (before rows of the group), footers (after rows of the group), or as both.

Set operations.
   Set operations allow the creation of a report specification by applying the set operators (union, difference, intersect) to two separate report specifications.

These constructs are then applied in combinations to the entities and attributes in an entity/relationship (E/R) model 21 to produce a report (query) specification.

The multi-dimensional constructs can be mapped to the E/R model 21 such that an E/R schema derived from an OLAP data source may act as the basis for the production of tabular and cross-tabulated reports. One example of such a mapping is defined as follows and presents the OLAP metadata as a star schema. Though other mappings are possible, all mappings can be shown to be equivalent representations of what is described below.

| Dimensional Construct | E/R Construct | Notes |
| --- | --- | --- |
| Cube | Schema | |
| Dimension | <None> | Represents a logical grouping of entities. |
| Measure Dimension | Entity | One fact entity for each set of identically scoped measures. |
| Hierarchy | Entity | |
| Level | Attribute | |
| Property | Attribute | Associated with a level attribute. |
| Measure (member of the measure dimension) | Attribute | Attribute in entity representing the fact table (entity) in a star schema. |
| <None> | Relationship | Represents the manner in which the fact entity is related to the other entities (dimensional hierarchies) in the schema. |

An E/R schema derived from an OLAP data source associates with the objects in the schema additional physical metadata providing the mapping from logical E/R objects to their corresponding objects in the OLAP data source. Some of this information is required, while other pieces of it are optional and are applicable for query optimization (discussed later), as indicated below.

| E/R Construct | Associated OLAP Metadata | Mandatory? |
| --- | --- | --- |
| Schema | Cube unique name | Yes. |
| Entity (Non-Fact) | Dimension/Hierarchy unique name | Yes. |
| | Balanced hierarchy? | No. |
| | Ragged hierarchy? | No. |
| | Multiple members at root level? | No. |
| Entity (Fact) | Fact table indication | Yes. |
| Attribute (Level, Non-Fact) | Level identifier indication | Yes. |
| | Level number | Yes. |
| | Level unique name | Yes. |
| Attribute (Property, Non-Fact) | Level number | Yes. |
| | Property unique name | Yes. |
| Attribute (Fact) | Aggregator | Yes. |
| | Semi-aggregator | Yes. |
| | Measure unique name | Yes. |
| | Data type | Yes. |
| | Parent unique name | Yes, if measure dimension contains hierarchies. |

Once a report has been authored using the E/R schema as its basis, the report specification is converted, using the same E/R schema, to produce a single OLAP (MDX) query containing all of the data associated from which the data to satisfy the original report may be obtained.

Note that though MDX is only one of several methods available for querying multi-dimensional data stores, it is the de facto standard for such operations. Several vendors support their own API, but also provide support for MDX. In those cases where a vendor-supplied MDX interface is not available, it is possible for an MDX interface to be constructed that in translates an MDX query into the native query interface. Hence, using MDX as the basis for specifying OLAP query semantics is applicable to all available OLAP data sources.

One embodiment of the invention provides a system of converting basic business report specifications into a single OLAP (MDX) query that can be issued to an underlying OLAP data source, as well as processing the results of the MDX query to product the results in a format consistent with the original report specification.

Figure 4:
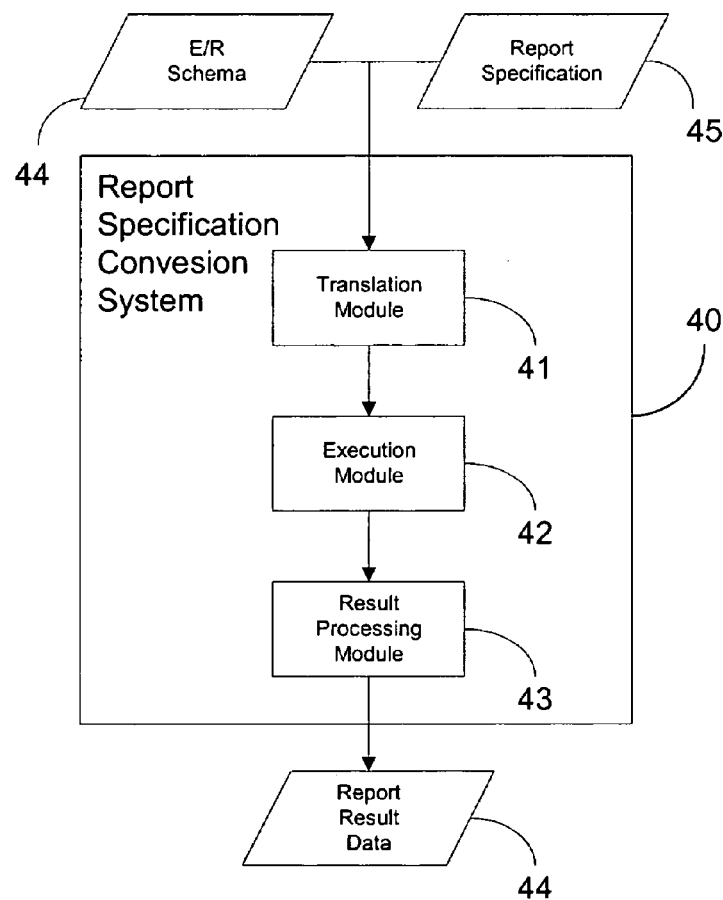
FIG. 4 shows an example of a report specification conversion system, in accordance with an embodiment of the present invention.

FIG. 4 shows an example of a report specification conversion system, in accordance with an embodiment of the present invention. The basic system consists of the following modules:

1. Translation Module 41

The translation module 41 accepts as input a tabular or cross-tabulated report in a form recognized by the translation module 41 and using constructs as described earlier in this document to describe the semantics of the report, as well as the E/R schema 44 used as the basis for the report 45. The objects within the E/R schema 44 are adorned with metadata providing a mapping to an underlying multi-dimensional data source, as described above.

The translation module 41 converts a report specification 45 and the information in the E/R schema 44 to generate a single MDX query that represents the semantics of the original report specification 45 and produces a result set 46 in a manner such that the result processing module 43 can generate the set of data corresponding to the original report specification 45.

In addition, the translation module 41 generates information for use by the result-processing module 43.

2. Execution Module 42

The execution module 42 executes the MDX query in the underlying multi-dimensional data source and produces a single multi-dimensional dataset.

3. Result Processing Module 43

The result processing module 43 uses the information generated by the translation module 41 to convert the multi-dimensional dataset into a result set 46 that reflects the original report specification's 45 semantics.

The report specification conversion system 40 may be implemented as a stand-alone module or system that can be added to a reporting application on the application server 12, the report server 13, the query engine 15, or the database server 14.

One aspect of the report specification conversion system 40 provides a multidimensional query tool (or system) for converting queries in one type of data model schema into another type of data model schema. One example of a multidimensional query tool is the translation module 41 that translates a report query based upon an E/R schema into a multidimensional data query that can be run on an OLAP engine. The multidimensional query tool may be implemented as a stand-alone module or system that can be added to the application server 12, the report server 13, the query engine 15, or the database server 14. Alternatively, the multidimensional query tool may be implemented as a module of the report specification conversion system 40.

Figure 5:
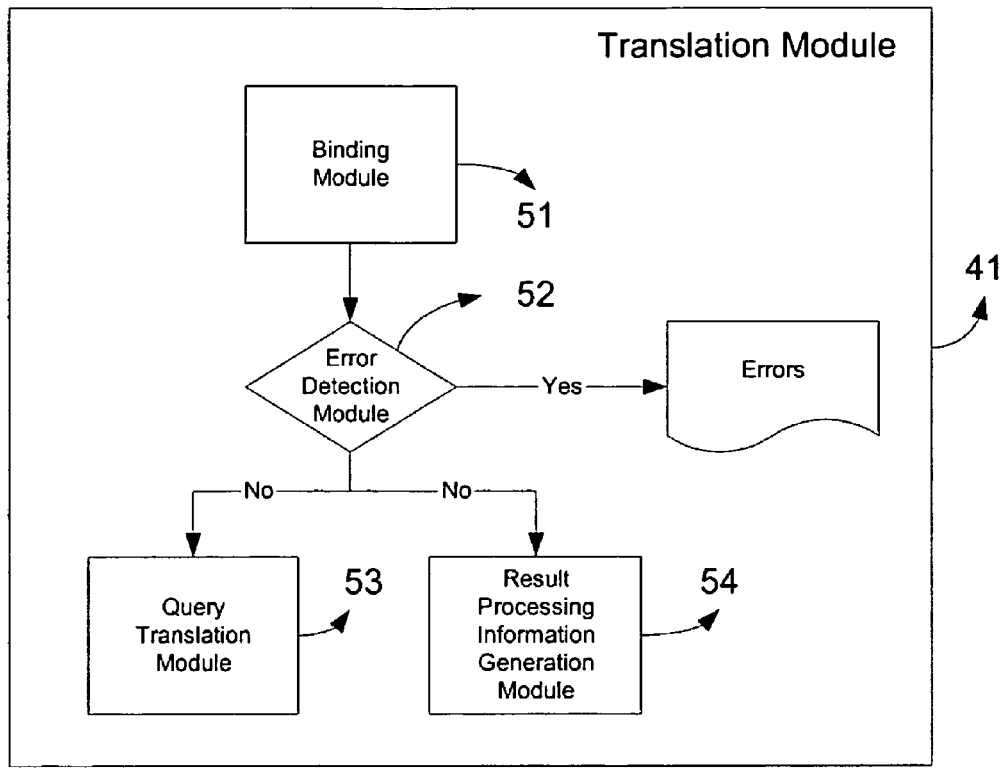
FIG. 5 shows an example of a translation module, in accordance with an embodiment of the present invention.

FIG. 5 shows an example of the translation module 41, in accordance with an embodiment of the present invention. The translation module 41 comprises the following modules:

1. Binding Module 51

The binding module matches each object referenced in the report specification 45 to its corresponding object in the E/R schema 44 and adds the associated multi-dimensional metadata information from the E/R schema 44 to the objects in the report specification 45.

2. Error Detection Module 52

By evaluating the constructs contained in the report specification 45 in relation to the multi-dimensional constructs to which those constructs are applied, the error detection module 52 determines if there are any interactions of report constructs and multi-dimensional metadata that preclude the generation of a single MDX query to represent the semantics of the original report specification 45. The error detection module 52 is optional, but preferable part of the translation module 41 for efficiency and error prevention.

3. Query Translation Module 53

The query translation module 53 translates the report specification 45 into a single MDX query that matches the semantics of the original query. An OLAP engine may process the MDX query. Preferably, the query translation module 53 also produces a dataset from which the result processing module 43 can produce a result set 46 consistent with the original report specification 45.

4. Result processing information generation module 54

The result processing information generation module 54 generates a collection of information that is used by the result processing module 43 to translate the output of the execution on the MDX query generated by the query translation module 53 into a data result set that reflects the semantics of the original query specification. The result processing information generation module 54 is optional as there are queries that do not require results to be returned directly to an end user. Preferably, this module 54 is present as it assists in the translation of the result back into the semantics of the original query specification for the end user.

Figure 6:
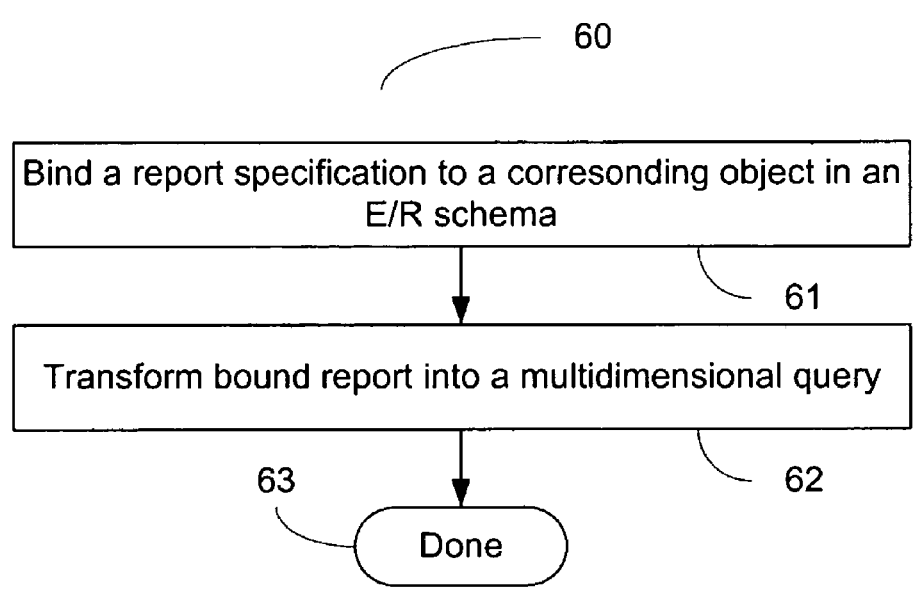
FIG. 6 shows in a flowchart an example of a method of translating a report specification based upon an E/R schema into a multidimensional query, in accordance with an embodiment of the translation module.

FIG. 6 shows in a flowchart an example of a method of translating a report specification based upon an E/R schema into a multidimensional query (60), in accordance with the translation module 41. The method (60) begins with binding a report specification to an E/R schema (61). This step (61) includes matching an object reference in the report specification to a corresponding object in the E/R schema and adding associated multidimensional metadata information from the E/R schema to the report specification object. Next, the bound report specification is translated into a multidimensional query (62) such as a single MDX query. This step (62) includes matching the semantics of the original report specification query. An OLAP engine may process the MDX query. The method is done (63).

Other steps may be added to the method (60) including determining if there are any interactions of report constructs and multi-dimensional metadata that preclude the generation of a single MDX query, producing a dataset that can be used to produce a result set consistent with the original report specification, and generating a collection of information used to translate the output of the MDX query into the result set.

Further description of concepts and examples of algorithms or methods used by the translation module 41 are described below.

Binding

A report specification 45 is comprised of a collection of report constructs applied to objects from a metadata schema, or to report constructs which in turn have been applied, in the end, to one or more metadata schema objects. The binding module 51 of the translation module 41 examines the report specification 45 and augments each metadata schema object with its corresponding multi-dimensional metadata in the E/R schema 44, as described earlier. This bound version of the report specification 45 forms the basis for all further translations and transformations performed by the translation module 41.

The report specification 45 may be represented in a different manner within the translation module 41 than as it was originally specified, but this does not affect the methods or algorithms described below.

Error Detection

The MDX query language imposes certain restrictions upon the semantics that can be expressed. Since these restrictions cannot be expressed in an E/R schema 44, it is possible to author a report against an E/R schema 44 based upon a multi-dimensional data source that exceed the capabilities of the MDX query language. Aside from errors that are independent of the underlying data source, the error detection module 52 rejects a report prior to query translation if it detects any of the following conditions:

1. Attributes from two or more hierarchies of a single dimension.
2. Attributes from a single dimension in different report dimensions.
3. Grouping of intermixed attributes from different dimensions.
4. Sorting of intermixed attributes from different dimensions.
5. Grouping of attributes representing level or dimension properties in presence of facts.
6. Range filters applied to attributes representing level identifiers.
7. Application of set operators to sets with differing dimensionality.
8. Facts representing data types not supported by a multi-dimensional data source.
9. Sorting on multiple attributes from a single level of a hierarchy.

Dimension/Hierarchy Entity to Fact Entity Relationships

Each relationship between a dimension/hierarchy entity and a fact entity represents either an inner or outer join relationship. This relationship is part of the E/R schema 44 definition, though it may be changed within a report specification 45, if so desired. Regardless, this relationship is translated into a corresponding MDX construct.

Inner join relationships may be replicated in MDX by placing a dimension on a separate edge of an MDX query and applying null suppression (NON EMPTY clause) to the edge. The absence of the NON EMPTY clause equates to an outer join between a dimension and fact entity.

In the algorithm presented, all non-fact dimensions are nested along a single edge of an MDX query and all facts appear on a separate edge, thus all dimension-to-fact relationships are either inner or outer joins due to the absence or presence of the NON EMPTY clause being applied to the non-fact dimension edge of the MDX query.

Single Entity No Filters, No Sorting, All Attributes

In this scenario, all of the attributes of single non-fact entity are projected in a tabular report. No other semantics are applied to the report. In addition, in terms of the underlying OLAP metadata model, there are no "gaps" in the hierarchy associated with the entity. For example, in a geography dimension with the levels country, state, and city, a gap would exist if the state level were not represented in the report.

In such a report, there are no measures (facts). In MDX terms, this means that no measure "slicer" needs to be specified since it is irrelevant as to which values are returned in the cross-tabulated result set since they are completely ignored in this particular instance. The single hierarchy that is referenced by the report is projected along a single edge of the query. It is the collection of members (and their associated property values) that are converted by a post-processing method into a tabular result set.

To obtain the necessary information to satisfy the tabular report, an MDX expression is generated that, in this case, obtains the collection of members from all levels referenced by the report and in addition projects all member properties also referenced by attributes in the report.

The MDX expression would be of the form

```
SELECT
    HIERARCHIZE( UNION( [LEVEL01].MEMBERS,
        [LEVEL02].MEMBERS ) )
    ON AXIS(0)
FROM [CUBE]
```

The HIERARCHIZE operator is ensures that parent/child relationships are represented in the axis rowset so that the post-processing method has the information it requires to generate the final tabular report. Note that the LEVEL.MEMBERS construct is the equivalent of projecting a column from a relational table.

In the case that a hierarchy contains level properties that are part of an entity's definition, those properties are projected in the MDX statement:

```
SELECT
    HIERARCHIZE( UNION( UNION( [LEVEL01].MEMBERS ),
        [LEVEL02].MEMBERS))
    DIMENSION PROPERTIES [MyDimension].[Property #1],
                        [MyDimension].[Property #2]
    ON AXIS(0)
FROM [CUBE]
```

Single Entity, with Filters, No Sorting, All Attributes

In this scenario, a filter is applied to one or more of the attributes.

Figure 7:
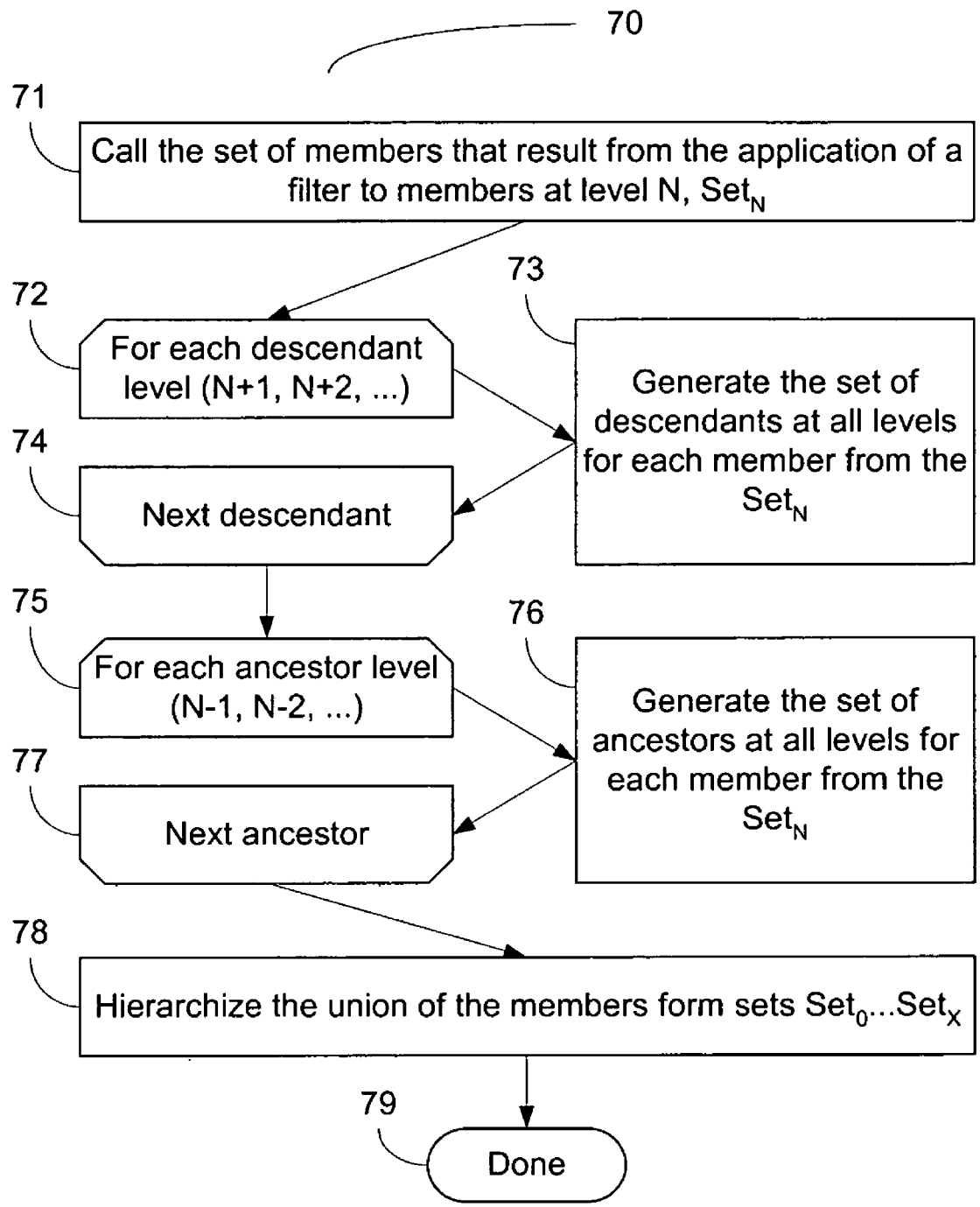
FIG. 7 shows in a flowchart an example of a method of generating the equivalent MDX query, in accordance with an embodiment of the translation module.

In the $_{simplest}$ case, a single filter is applied to a single attribute. If the filter is applied to an attribute at level N in a hierarchy with X levels, the method of generating the equivalent MDX query comprises the following steps as shown in FIG. 7:

1. Call the set of members that result from the application of the filter to the members at level N, $Set_N$ (71).
2. For each descendant level (N+1, N+2, . . . ), generate the set of descendants at all levels for each member from $Set_N$ (72 to 74).
3. For each ancestor level (N−1, N−2, . . . ), generate the set of ancestors at all levels for each member from $Set_N$ (75 to 77).
4. Union these sets (78).

In MDX terms, this appears as follows:

```
WITH SET [FilterSet] as
    'FILTER( [MyDimension].[LEVEL N].MEMBERS, <some filter expression>)'
SELECT
    GENERATE ( [FilterSet],
        UNION (UNION (...
            {ANCESTOR( [MyDimension].CURRENTMEMBER, [LEVEL 0] )}, ...
            {ANCESTOR(   [MyDimension].CURRENTMEMBER, [LEVEL N − 1] )},
            {[MyDimension].CURRENTMEMBER},
            DESCENDANTS([MyDimension].CURRENTMEMBER, [LEVEL N + 1], SELF),...
            DESCENDANTS ([MyDimension].CURRENTMEMBER, [LEVEL X], SELF)
        ) ) ...) ON AXIS(0)
FROM [MyCube]
```

A filter expression containing AND/OR logic upon attributes (key and property items) from a single level in a hierarchy can be expressed as either a single FILTER expression, or as a series of nested FILTER expressions.

All filters are correlated (based on AND/OR logic) at the lowest filtered level. The more general algorithm described earlier in this section is then applied as if only the filter at the lowest level was applied to the query.

In a hierarchy with X levels and a filter expression containing the AND'ing of two filters, one to level N and the other to level S (where N is a higher level than S), the generated MDX would appear as follows:

```
WITH
SET [Filter Set N] as '<filter expression for level N>'
SET [Filter N Descendants at Level S] as
    'GENERATE( Filter Set N], DESCENDANTS( [MyDimension].CURRENTMEMBER,
    [Level S], SELF))'
SET [Filter Set S] as 'INTERSECT(<filter expression for level S>,
                        [Filter N Descendants at Level S])'
SELECT
GENERATE( [Filter Set S],
    UNION(
        {ANCESTOR( [MyDimension].CURRENTMEMBER, [LEVEL 0] )}, ...
        {ANCESTOR( [MyDimension].CURRENTMEMBER, [LEVEL S − 1] )},
        {[MyDimension].CURRENTMEMBER},
        DESCENDANTS([MyDimension].CURRENTMEMBER, [LEVEL S + 1], SELF),...
        DESCENDANTS ([MyDimension].CURRENTMEMBER, [LEVEL X], SELF)
    ) ) ON AXIS(0)
FROM [MyCube]
```

An OR expression is handled in a fashion similar to an AND expression, except that sets of the various filtered sets are UNION'ed together instead of INTERSECT'ed.

Single Entity, No Filters, No Sorting, Not All Attributes

This categorization of reports may result in the following (possibly overlapping) scenarios:

The attribute that represents the key of a level is not included in the report.

A subset of the properties of a level is present in the report.

None of a level's associated attributes are included in a report.

In the first scenario, the post-processing method does not include the member unique name as a column in the tabular result set.

In the second scenario, the generated OLAP (MDX) query only refers to the dimension properties specified in the query. The post-processing method is not required to perform any different processing than what is described above.

In the third scenario, the generated OLAP (MDX) query may refer to the missing level(s) in terms of filters applied to the result set (as described below), but none of the members from those levels are projected along the edge of the OLAP (MDX) query. For reasons described below, different method steps are used in the presence of "gaps" in the hierarchy (assuming the absence of any filters—their presence would be similar to that above, but is ignored since it would complicate the description of the current method):

For the highest level, N, at which at least a single attribute is included in the tabular report, generate the set of all members for this level. Call this $Set_N$.

For each level below N that contains at least a single attribute in the tabular report, generate the set of all descendants of the members from the level most directly above the current level in the hierarchy (and in the report). Call these sets $Set_{N+X}$.

Union and hierarchize these sets.

The OLAP (MDX) would appear as follows:

```
WITH
SET [Set N] as '[LEVEL N].MEMBERS'
SET [Set N + 1] as
'GENERATE ( [Set N], DESCENDANTS ( [MyDimension].CURRENTMEMBER, [Level
N + 1], SELF)'...
SET [Set N + X] AS
'GENERATE( [Set N], DESCENDANTS( [MyDimension].CURRENTMEMBER, [Level
N + X], SELF)'
SELECT
HIERARCHIZE( UNION( [Set N], UNION( [Set N + 1], ... UNION( [Set N + X –
1], [Set N + X])))))
ON AXIS(0)
FROM [MyCube]
```

Single Entity, No Filters, Sorting, All Attributes

There are different scenarios for sorting attributes of a single entity:

A sort is specified on a single attribute from the highest level in the hierarchy.

Sorts are specified on multiple attributes from the highest level in the hierarchy.

A sort is applied to any other level that the highest level in the hierarchy.

A sort is applied to two or more levels in the hierarchy.

In all cases, the basic rule is the same—set generation begins with the first sorted level.

In the first scenario, the ORDER operator is applied to the members of the highest level. For each member in this sorted set of members, the hierarchized set of the descendants at the other levels in the report is generated. The generated OLAP (MDX) query would appear as follows:

```
WITH SET
[Ordered Level 0] as
'ORDER( [Level 0].MEMBERS, <some sort expression>)'
SELECT
GENERATE( [Ordered Level 0],
UNION( {[MyDimension].CURRENTMEMBER},
HIERARCHIZE(
UNION(
DESCENDANTS([MyDimension].CURRENTMEMBER,
[Level 1], SELF),...
DESCENDANTS([MyDimension].CURRENTMEMBER,
[Level N], SELF)))
)
ON AXIS(0)
FROM [MyCube]
```

In the third scenario (sort applied at a non-root level in the hierarchy), the sorted set of members at the specified level is created and the set of ancestors pre-pended to each member from this set and each member followed by its descendants at the lower levels of the hierarchy in the report. The OLAP (MDX) query is as follows:

```
WITH SET
[Ordered Level N] as
'ORDER( [Level N].MEMBERS, <some sort expression>)'
SELECT
GENERATE( [Ordered Level N],
UNION(
{ANCESTOR( [MyDimension].CURRENTMEMBER, [Level 0], SELF)},
...
{ANCESTOR( [MyDimension].CURRENTMEMBER,
[Level N – 1], SELF)},
{[MyDimension].CURRENTMEMBER]}),
```

-continued

```
HIERARCHIZE (UNION(
DESCENDANTS([MyDimension].CURRENTMEMBER,
[Level N + 1], SELF),...
DESCENDANTS([MyDimension].CURRENTMEMBER,
[Level X], SELF)))
))
ON AXIS(0)
FROM [MyCube]
```

Again, there is no special rule required in the post-processing method to deal with the output of the MDX query.

In the final scenario (sort applied to two or more levels), the sorts are applied in a top-down order based upon the level in the hierarchy upon which the sorts are applied. For the highest level at which a sort is applied, any ancestors from higher levels are pre-pended to the each member from the sorted level. If there are intervening, unsorted levels between two sorted levels, the intermediate level's members are appended to their parent in the sorted level. At a sorted level that is within another, higher level sort, the lower level descendants at the second sorted level are sorted and place after the member from the higher level.

In the following example, the hierarchy is continent, country, state, and city. A sort is applied to the country and state levels.

```
SELECT
   GENERATE(
      ORDER([Geography].[Country].MEMBERS,
                  <some sort expression>, BASC),
         UNION(
            {ANCESTOR([Geography].CURRENTMEMBER,
[Geography].[Continent]},
               {[Geography].CURRENTMEMBER},
               GENERATE(
                  ORDER(
                     DESCENDANTS( [Geography].CURRENTMEMBER,
                         [Geography].[State]),
                     <some sort expression>, BASC),
                  UNION( {[Geography].CURRENTMEMBER},
                     DESCENDANTS( [Geography].CURRENTMEMBER,
                         [Geography].[City]) ) ) )
)
ON AXIS(0)
FROM [MyCube]
```

Single Entity, Filters, Sorting, All Attributes

This scenario merges the MDX query generation rules above for filters and sorting. The sorting rule prevails, but the filter rule is applied to the first sorted level instead of the lowest filtered level. In addition, when descendant sets are computed (based on the sorting rule), they are intersected with the members of the current level based on the remaining members at all lower levels.

Assuming the previous example on sorting with an additional filter on City level, the MDX is as follows:

Multiple Entities, No Facts

In a query that references multiple dimension entities, but no facts from the "pseudo" fact table, the equivalent relational query semantics would be to implicitly join the dimension tables via the fact table over an arbitrary fact.

In order to represent these semantics, each entity (dimension/hierarchy) is treated as a separate entity and MDX generated as described above. The resulting MDX set expressions are then crossjoin'ed on a single axis. The NON EMPTY clause is applied to the edge to remove all intersections from dimensions for which there is no corresponding fact value.

The OLAP query (MDX) generation method does not account for sort specifications in which the sort applied to multiple levels in a single dimension is interspersed with sorts to attributes from other dimensions.

One or More Dimension Entities, One or More Facts, No Summarization, No Grouping, No Sorting This type of report is a simple list report that provides the values of a fact corresponding to the lowest level projected from the dimension contained in the report. In this simple case, an MDX query is generated that projects the dimension members along a single edge (as described above) and the single measure along a second edge. The fact values are implicitly rolled up along all other dimensions in cube in reference to their default member (typically, the "ALL" member). Ideally, the leaf-level members from all other dimensions should be crossjoin'ed along another edge to ensure that the lowest-level values are obtained from the cube for the attributes in the report.

In the presence of multiple facts, all facts are projected along a single edge.

In the following scenarios, it is assumed that they all address the case of one or more dimensions.

One or More Facts, No Summarization, No Grouping, Sorting

In a report containing one or more facts, the presence of a sort that is applied only to the dimensional attributes is handled as described above since the sort is contained entirely in the MDX set expression involving the members.

```
SET S3 AS 'FILTER( [Geography].[City].MEMBERS,
                  <filter expression for [City]
level> )'
SET S2 AS 'GENERATE( S3, {ANCESTOR( [Geography].CURRENTMEMBER,
                  [Geography].[State]})'
SET S1 AS 'GENERATE( S3, {ANCESTOR( [Geography].CURRENTMEMBER,
                  [Geography].[Country]})'
SELECT
   GENERATE(
      ORDER( S1 , <some sort expression>, BASC),
         UNION(
            {ANCESTOR([Geography].CURRENTMEMBER,
[Geography].[Continent]},
               {[Geography].CURRENTMEMBER},
               GENERATE(
                  ORDER(
                     INTERSECT(DESCENDANTS( [Geography].CURRENTMEMBER,
                         [Geography].[State]) , S2),
                     <some sort expression>, BASC),
                  UNION( {[Geography].CURRENTMEMBER},
                     INTERSECT(DESCENDANTS( [Geography].CURRENTMEMBER,
                         [Geography].[City]), S3 ) ) )
)
ON AXIS(0)
FROM [MyCube]
```

If a sort is applied to a fact, this sort must also be applied to the dimensional set expression—there is no way in MDX to sort the fact values. Consequently, the sort expression is the fact upon which the sort is applied in the business/tabular report.

Figure 8:
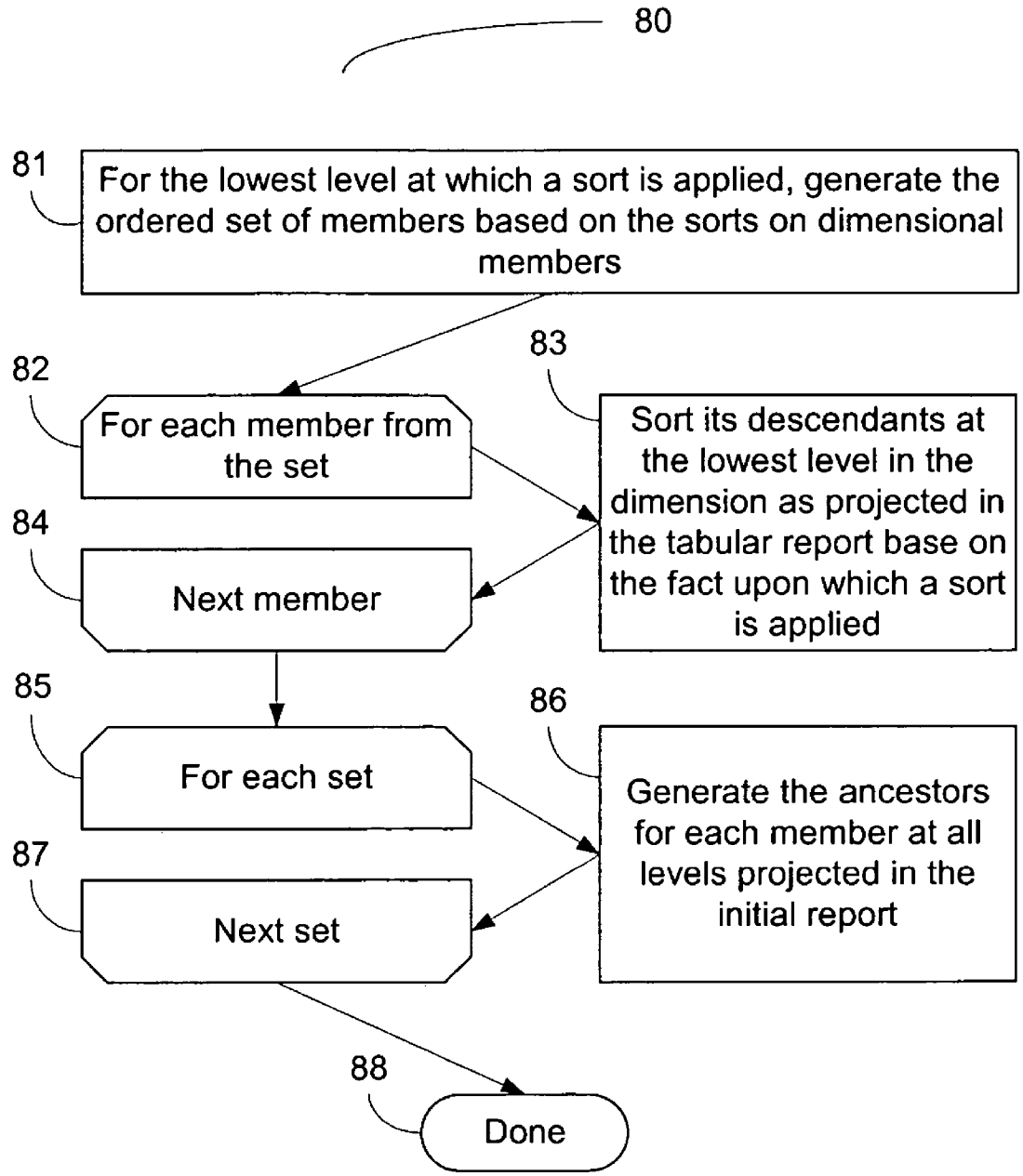
FIG. 8 shows in a flowchart another example of a method of generating the equivalent MDX query, in accordance with an embodiment of the translation module.

If a sort is applied to level of a hierarchy and to a fact, then the MDX generation method behaves as follows (as shows in FIG. 8):
1. Generate the ordered set of members as described above based on the sorts on dimensional members, but only for the lowest level at which a sort is applied (81).
2. For each member from the set generated in step #1 (81), sort its descendants at the lowest level in the dimension as projected in the tabular report base on the fact upon which a sort is applied (82-84).
3. From the set generated in step #1 (81), generate the ancestors for each member at all levels projected in the initial report (85-87).

If a sort is applied to multiple facts, then the innermost sort is applied as described above. All subsequent sorts are applied to the results of the previous sort in an innermost to outermost order. Because of the MDX specification, the results are equivalent to the multiple sort specifications in a tabular report.

That is, a business report specification of
SORT([FACT #1]), SORT([FACT #2]), . . . SORT([FACT #N])
is equivalent to the MDX expression

```
ORDER(
  ORDER(
    ORDER( <original set>,
      [FACT #N]
    ),
    ...
    [FACT #2]
  ),
  [FACT #1]
)
```

One or More Facts, Summarization, No Grouping, No Sorting

A summarized tabular report with facts is equivalent to the same report without summarization (grouping on all non-fact columns) due to the manner in which the non-summarized report is generated as MDX. Effectively, both are summarized reports and there is no actual "detail" report.

One or More Facts, No Summarization, Grouping, No Sorting, No Filters

Grouping can be performed in the absence of facts, but it is their presence that grouped reports are most often found. Grouping an attribute in a client reporting tool typically causes the following behavior in a report:
- Only distinct values of the grouped item appear in the report.
- All rows of the report that contain the same value of the grouped attribute appear nested within the grouped item, i.e., the grouped item and all preceding columns appear once.
- A summary value that aggregates all of the nested fact values appears as either a "header" or "footer" for the group.

In the absence of filters, all of the rollup values contained in an OLAP cube are consistent with the detail rows portrayed at lower levels in a hierarchy. The OLAP (MDX) query generation method requires that:
- The ordering of grouping of attributes from a hierarchy increase in depth from left to right in the report specification. Gaps are allowed.
- All grouped attributes from a single hierarchy must be adjacent to one another in the tabular report specification.

With these restrictions, the MDX generation is unaffected, but the post-processing code must be informed of which attributes are grouped in the report specification and produced likewise groupings of values. The stack-based approach is still used, but instead of producing complete rows for each unique combination, sub-sets are produced for each complete row. As well, the summarization value associated with each grouped attribute is included in the output to the client application.

The order of grouped items against an OLAP data source is the "natural" order of the items in the data source.

One or More Facts, No Summarization, Grouping, Sorting, No Filters

Sorts may be applied to attributes to the left and/or right of grouped attributes. In either case, sorts are applied as in tabular, non-grouped reports. The difference again is that the post-processing method must apply the same logic as described above for providing grouped list result set information.

One or More Facts, No Summarization, Grouping, Sorting, Filters

Pre-Filter Aggregation

Aggregated (rolled up) values in an OLAP cube (typically) represent pre-filtered aggregated values; in some cases, specific calculations may be applied to determine the aggregate value of a particular cell or group of cells within an OLAP cube.

When a filter is applied to a report, it may be applied before or after aggregation. To this point, the assumption has been that all filters have been applied post-aggregation (equivalently, that the aggregation has been applied pre-filter). This requires no specific MDX generation.

Post-Filter Aggregation

On the other hand, the specification of a pre-aggregation filter implies that one or more rows of fact values must be filtered prior to the calculation of any report aggregate values. This requires that the OLAP (MDX) query generation method create the necessary calculated members to calculate these values.

The indication that a filter is to be applied prior the calculation of aggregate values only imposes special MDX generation rules if the filter is applied to a level of a hierarchy for which an ancestor level is also projected in the report or referenced by an expression.

Figure 9:
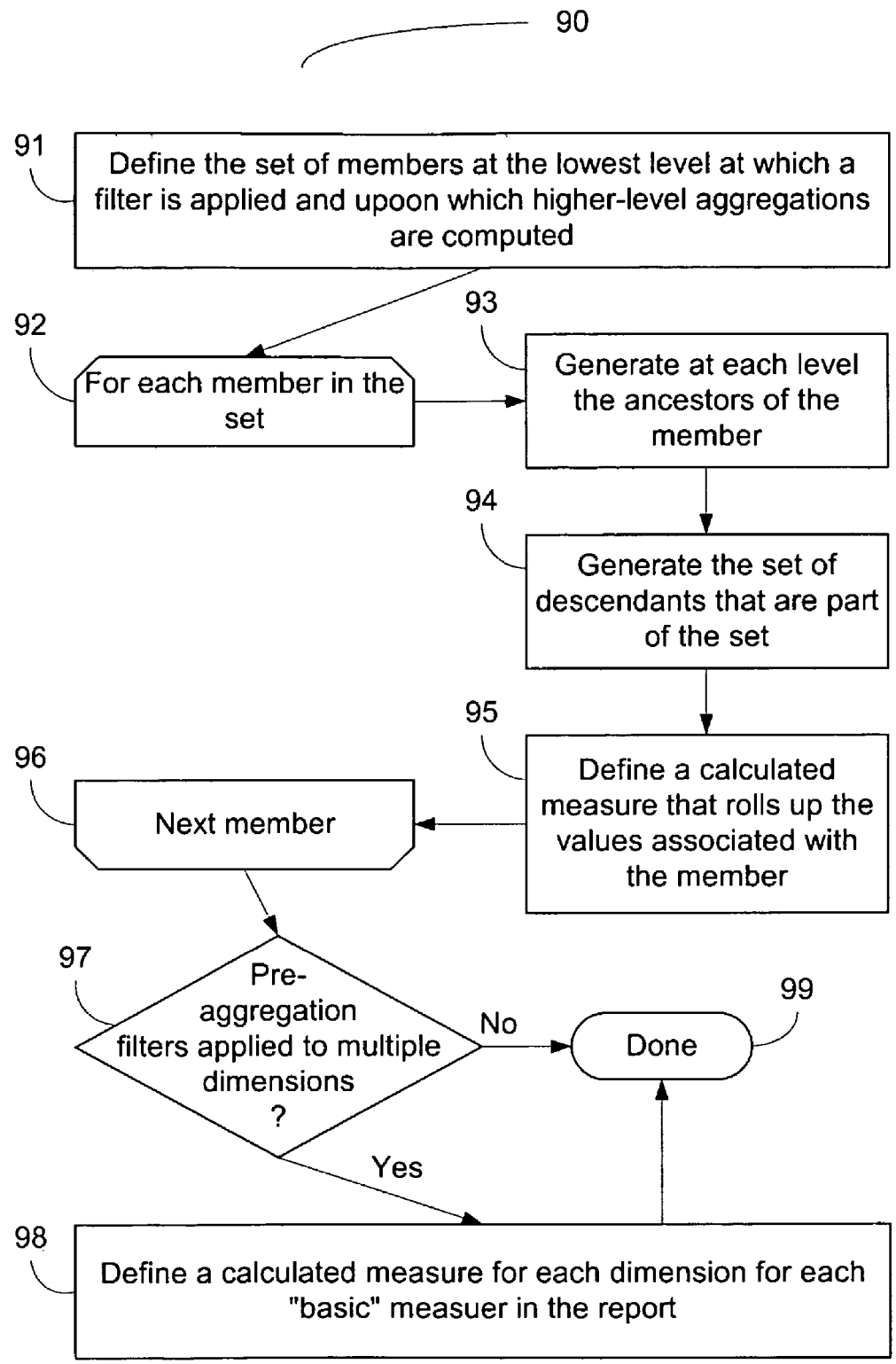
FIG. 9 shows in a flowchart an example of a method of calculating post-filter aggregation values, in accordance with an embodiment of the translation module.

The general method of calculating post-filter aggregation values (90) comprises the following steps (as shown in FIG. 9):
1. Define the set of members at the lowest level at which a filter is applied and upon which higher-level aggregations are computed (91).
2. For each member in the set from step #1 (91), generate at each level the ancestors of those members (93).
3. For each member in the set from step #2 (91), generate the set of descendants that are part of set #1 (94).
4. Define a calculated measure that rolls up the values associated with the members (95) from step #3 (94).
5. In the case of pre-aggregation filters applied to multiple dimensions (97), a calculated measure is defined for each dimension for each "basic" measure in the report (98). Outer-level dimensions within the nesting of dimensions along the axis of the MDX query define their measures in terms of the calculated measures defined for post-filter aggregation in the dimension nested below it.

In this example, assume a country/state/city geography dimension that is filtered (pre-aggregation) to only include the top 5 cities by sales and reports on the unit sales based on country/state/city.

```
WITH
SET S0 AS
'TOPCOUNT( [Geography].[City].MEMBERS, 5, [Sales] )'
SET S1 AS
'GENERATE( S0, {ANCESTOR( [Geography].CURRENTMEMBER,
[Geography].[State])})'
SET S2 AS
'GENERATE( S0, {ANCESTOR( [Geography].CURRENTMEMBER,
[Geography].[Country])})'
MEMBER [Measures].[Unit Sales Post-Filter] AS
'IIF([Geography].CURRENTMEMBER.level.ordinal<3,
AGGREGATE(
   INTERSECT(
      DESCENDANTS( [Geography].CURRENTMEMBER,
            [Geography].[City]
      ),
      S0
   ),
   [Unit Sales]
), [Unit Sales] )'
SELECT
{[Measures].[Unit Sales Post-Filter]} ON AXIS(0),
GENERATE(
   ORDER( S2, <order criteria for Country>),
   UNION(
      {[Geography].CURRENTMEMBER},
      GENERATE(
         ORDER( INTERSECT(
            DESCENDANTS(
               [Geography].CURRENTMEMBER,
               [Geography].[State]
            ),
            S1
         ), <order criteria for State> ),
         UNION(
            {[Geography].CURRENTMEMBER},
            INTERSECT(
               DESCENDANTS(
                  [Geography].CURRENTMEMBER,
                  [Geography].[City]
               ),
               S0
            )
         )
      )
   )
) ON AXIS(1)
FROM [MyCube]
```

Interaction of Summary Values and Post Filter Aggregations

In a report that contains both summary values and post filter aggregations, the generated MDX contains both calculated members (non-measure dimension) and calculated measures. In the instances where these calculated members/measures intersect, it is necessary to ensure that the calculated measure prevails because these calculated members represent the aggregation of the measure post aggregation at specific levels in the hierarchy.

In the presence of pre-filter aggregation, the priority of the calculated members/measures is reversed.

The SOLVE_ORDER construct of MDX is used to convey the priority of the cell calculations.

In the following example, assume the previous example with the following modifications:

No sorting

An additional entity, [Year], is added to the report and is the first grouped column of the report.

An additional filter is applied to a numeric entity: [Unit Sales]>50000.

Also, there are two distinct aggregations of [Unit Sales], total and maximum.

Whenever, two or more dimensions are encountered and at least one has multiple levels, the algorithm for MDX generation for post-filter calculations is to apply the general approach for multiple dimensions, but only if the aggregation is neither COUNT nor AVERAGE. In those two particular cases, a cross join of the dimensions is performed first to ensure proper calculation of the aggregated values.

Example

```
WITH
SET S0 AS
'TOPCOUNT( [Geography].[City].MEMBERS, 5, [Sales] )'
MEMBER [Year].[m1] AS 'AGGREGATE ([Year].[LEVEL01].MEMBERS)'
SOLVE_ORDER = 1
MEMBER [Geography].[m2]AS 'AGGREGATE( S0 )' SOLVE_ORDER = 2
MEMBER [Measures].[m3] AS 'IIF( [Unit Sales]>5000, [Unit Sales],
NULL)'
MEMBER [Measures].[m4] AS
'IIF([Geography].CURRENTMEMBER.level.ordinal<3,
SUM(
   INTERSECT(
      DESCENDANTS( [Geography].CURRENTMEMBER,
            [Geography].[City]
      ),
      S0
   ),
   [Measures].[m3]
), [Measures].[m3])'
MEMBER [Measures].[Total Unit Sales Post-Filter] AS
'IIF([Year].CURRENTMEMBER.level.ordinal<1,
SUM( DESCENDANTS( [Year].CURRENTMEMBER,
         [Year].[LEVEL01] ), [Measures].[m4]
), [Measures].[m4] )'
MEMBER [Measures].[m5] AS
'IIF([Geography].CURRENTMEMBER.level.ordinal<3,
MAX(
```

```
-continued

INTERSECT(
    DESCENDANTS( [Geography].CURRENTMEMBER,
            [Geography].[City]
    ),
    S0
),
[Measures].[m3]
),    [Measures].[m3])'
MEMBER [Measures].[Max Unit Sales Post-Filter] AS
'IIF([Year].CURRENTMEMBER.level.ordinal<1,
MAX(    DESCENDANTS( [Year].CURRENTMEMBER,
            [Year].[LEVEL01] ), [Measures].[m5]
), [Measures].[m5] )'
SELECT
{[Measures].[Total Unit Sales Post-Filter],
    [Measures].[Max Unit Sales Post-Filter]} ON AXIS(0),
UNION( CROSSJOIN({[Year].[m1]} ,
{[Geography].[m2]}),
CROSSJOIN( [Year].[LEVEL01].MEMBERS,
UNION({[Geography].[m2]},
GENERATE( S0,
    UNION(
        {ANCESTOR([Geography].CURRENTMEMBER, [Geography].[Country])},
        {ANCESTOR([Geography].CURRENTMEMBER, [Geography].[State])},
        {[Geography].CURRENTMEMBER}
)))))
ON AXIS(1)
FROM [MyCube]
```

Pre & Post Filter Aggregation

The presence of both pre and post filter aggregation simply requires that the generated MDX query contain multiple measures—the default measures in the cube and the calculated measures as described above.

Multiple Root Members in a Hierarchy

In the majority of hierarchies, there is a single "root" (or "ALL") member at the highest level of the hierarchy (ordinal zero). In the case of a report that requires a summary value for the entire hierarchy, and in which no filter has been applied in the report to any attribute associated with the hierarchy, the aggregate value of a fact that is associated with the "ALL" member represents the summary value.

In the case of a hierarchy in which the root level contains two or more members (i.e., there is no single "ALL" member), there is still an expectation of a report author to be able to obtain an overall summary—the absence or presence of a single "ALL" member is irrelevant when authoring a report based on an E/R schema.

To produce the overall value for a hierarchy, the translation module generates a calculated member for the measure that aggregates the members of the root level (using the AGGREGATE function) and assigns a pre-defined name to the measure such that the result-processing module can identify it as such.

It should be noted that this is a specific application of the method used to calculate aggregate values in the presence of filters.

Summary Values

Calculated members are introduced in each dimension for which summary values are required. These are given a fixed name that can be recognized by the post-processing code as summary values.

Filter on Entities not in the Query

In all previous examples, filters have been applied to entities that appear in the actual query. It is quite typical, however, that filters are applied to entities that do not appear in the report. This has the effect of reducing the data that appears within the report.

In the case of a filter that is applied to an entity that represents the key identifier of a level within a multi-dimensional data source, if that filter consists of a single equality comparison, the filter can appear in the "slicer" (WHERE clause) of the generated MDX statement.

In the following example, entities from the [Geography] dimension are projected in the report, but a filter is applied to an entity from the [Product] dimension. The filter appears in the WHERE clause.

```
SELECT
HIERARCHIZE(UNION(UNION([Geography].[Country].MEMBERS,
[Geography].[State].MEMBERS), [Geography].[City].MEMBERS))
DIMENSION
PROPERTIES PARENT_UNIQUE_NAME ON AXIS(0),
{[(Measures].[Cost]}
ON AXIS(1)
FROM [Cube]
WHERE ([Product].[Vacuum])
```

In the case of a similar filter that applies to multiple equality comparisons (or equivalently, an IN clause), a single calculated member (measure) is created for each measure that aggregates the measure for the set of members in the filter. Depending upon the logic (AND/OR) in the original filter, appropriate IF-THEN-ELSE logic is encapsulated in a calculated member to determine the value of the fact entity in the report. For an OR clause, the value of each calculated member of each of the OR'ed filters is compared to null and the first non-null value is taken as the value of the measure.

In the following example, only entities from the [Geography] dimension appear in the report, but the filter, "[Product code] in ('a', 'b', 'c')" is applied to the report.

```
WITH
MEMBER [Measures].[ m1] AS 'SUM(FILTER([Product].[LEVEL01].MEMBERS,
[Product].[Product code] = "a"), [Measures].[Cost])'
MEMBER [Measures].[ m2] AS 'SUM(FILTER([Product].[LEVEL01].MEMBERS,
[Product].[Product code] = "b"), [Measures].[Cost])'
MEMBER [Measures].[ m3] AS
'IIF([Measures].[ m1] <> NULL, [Measures].[ m1], [Measures].[ m2])'
MEMBER [Measures].[ m4] AS 'SUM(FILTER([Product].[LEVEL01].MEMBERS,
[Product].[Product code] = "c"), [Measures].[Cost])'
MEMBER [Measures].[ Cost] AS
'IIF([Geography].CURRENTMEMBER.LEVEL.ORDINAL < 3,
SUM(DESCENDANTS([Geography].CURRENTMEMBER, [Geogrpahy].[City]),
IIF([Measures].[ m3] <> NULL, [Measures].[ m3], [Measures].[ m4])),
IIF([Measures].[ m3] <> NULL, [Measures].[ m3], [Measures].[ m4]))'
SELECT
FILTER(HIERARCHIZE(UNION([Geography].[Country].MEMBERS,
[Geography].[City].MEMBERS)), [Measures].[ Cost] <> NULL) ON
AXIS(0),
{[Measures].[ Cost]} ON AXIS(1)
FROM [$ZD1AUTC01]
```

Result Information Generation

Once a report specification has been successfully translated into an OLAP (MDX) query, the following information may be produced by evaluating the generated query and the relationship between report constructs and their corresponding construct in the MDX query:

Type of report (tabular, grouped, cross-tabulated).
Do all report columns represent facts?
Do any of the report columns represent facts?
Does the report contain overall summary rows?
For each column in the report:
Label by which the column may be identified
MDX dimension and level
Report dimension and level
Edge number
Type—fact, calculation, property, level
Ordinal position of the property, if applicable.
Query information:
Number of measures
Number of edges
For each edge
  List of dimensions on the edge
  For each dimension
    Name of dimension
    Is an overall summary present for this dimension?
    List of levels referenced (label and level number)

Another aspect of the report specification conversion system 40 provides a post-processing tool having reporting capabilities to provide universal data access that is transparent to the end user. That is, the person using such a reporting tool does not need to be aware where of the data is located or how the data is stored. The end user should not care about the manner in which data is physically stored (e.g., relational database, network database) or the manner in which it is logically stored (e.g., separate tables, networked constructs).

One example of a post-processing tool is the result processing module 43 that converts a multi-dimensional data set into a result set that reflects the semantics of an E/R report specification. The post-processing tool may be implemented as a stand-alone module or system that can be added to the application server 12, the report server 13, the query engine 15, or the database server 14. Alternatively, the post-processing tool may be implemented as a module of the report specification conversion system 40.

The post-processing tool provides a singular view of a collection of heterogeneous data sources. A user can then author reports in a consistent fashion without regards to the physical or logical constraints or differences of the underlying data sources. Such reports require the execution of one or more data source specific queries, each possibly specified in a language/semantics specific to that data source.

The results of the data source specific queries can be returned in a variety of formats, depending upon the capabilities and characteristics of the underlying data sources. The results of these queries must be formulated into a single result set that reflects the original semantics of the user's query.

Three software components can be produced individually, each performing a specific task, that combined provide the backbone of a heterogeneous reporting application. Those components are:
Modeling
Query Generation
Result Transformation Each of these components can be devised to deal with one or more of the possible combinations of data sources, model representations, and report types. For example:

A modeling component may choose to support network (CODASYL) data sources and model them in an entity-relationship model.

A query generation component may choose to support the translation of queries posed against an entity-relationship model into CODASYL queries.

A result transformation component may choose to support the transformation of CODASYL query results into tabular results.

With the use of an agreed upon set of application programming interfaces (APIs) for each of these components (or barring that, the introduction of software to perform the necessary transformations from one API to another), these components may form the basis of a post-processing reporting tool. The more capabilities supported by a particular component, or the more variety of such tools used by a particular application, the larger the variety of data sources, models, queries and results supported by the application.

One example of a post-processing tool is the result processing module 43. Described below is the result transformations to convert the results of a single OLAP (MDX) query into a tabular or cross tabulated report based upon a set of supplied directives on how to process the results of the OLAP query.

Figure 10:
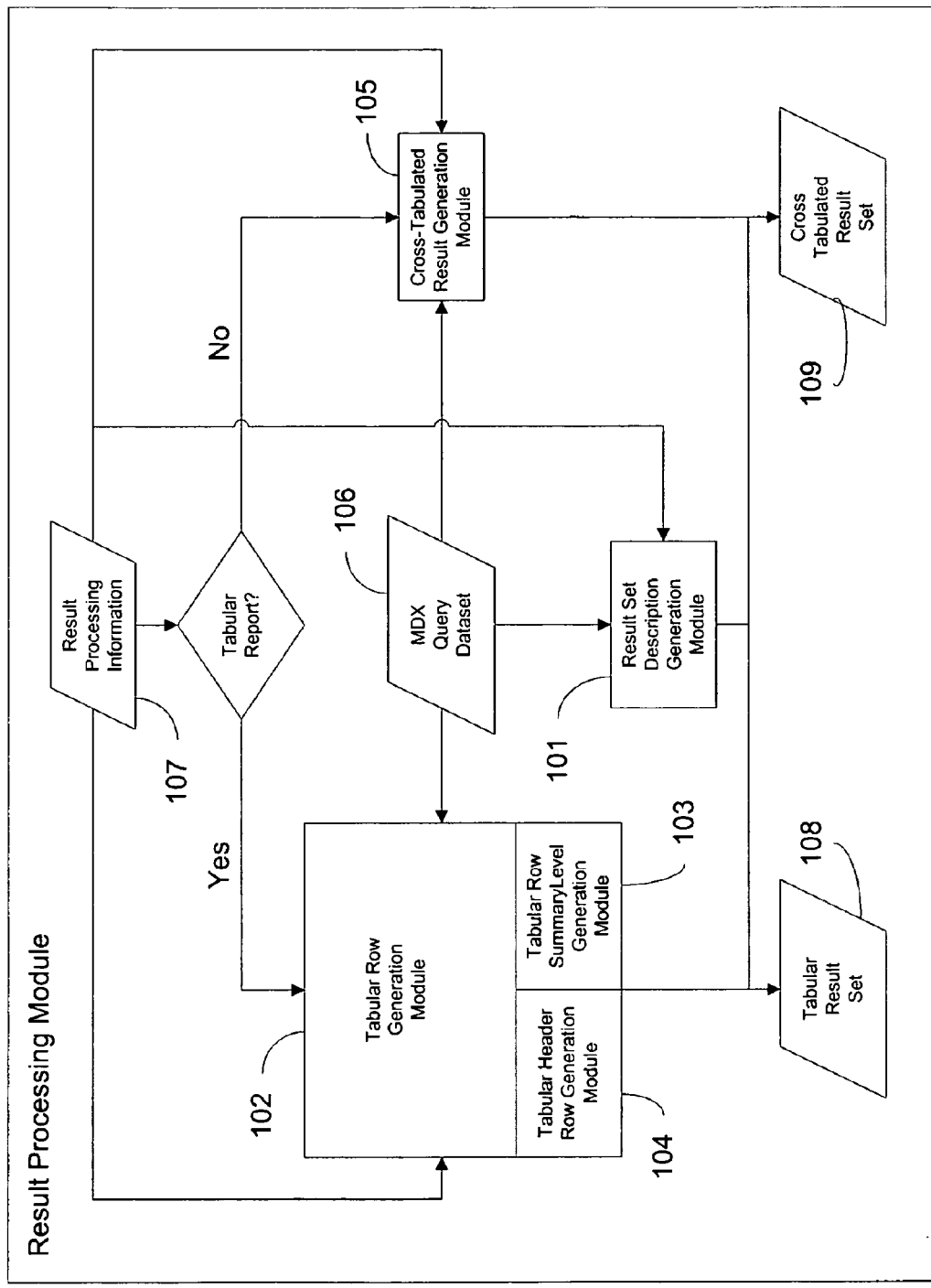
FIG. 10 shows an example of the result processing module, in accordance with an embodiment of the present invention.

FIG. 10 shows an example of the result processing module 43, in accordance with an embodiment of the present invention. The result processing module 43 comprises the following modules:

1. Result Set Description Generation Module 101

This module 101 takes as input the result set 106 description from the execution of an MDX query by an underlying multi-dimensional data source and, using result processing information 107, produces a result set 108 description for the result set 46 that is generated by the result-processing module 43, which in turn reflects the semantics of the original report specification 45. The result processing information 107 may generated by the translation module 41, or alternatively, provided to the result processing module 43 as a set of rules.

2. Tabular Row Generation Module 102

This module 102 converts the results of a multi-dimensional result set (referred to in the OLE DB for OLAP specification as a dataset) into a collection of rows of data.

3. Tabular Summary Level Calculation Module 103

This module 103 calculates the summarization level (described below) of each row of data in the rowset generated by the tabular row generation module 102.

4. Tabular Header Row Generation Module 104

This module 104 produces header rows (described below) for inclusion in the rows of data produced by the tabular row generation module 102.

5. Cross-Tabulated Result Generation Module 105

This module 105 converts the results of the execution of the MDX query into a cross-tabulated result set 109 that matches the semantics of the original query specification 45. In the case of cross-tabulated reports, the data from the MDX query closely resembles the original query specification 45 and requires processing to align the metadata and layout with the original specification 45.

Figure 11:
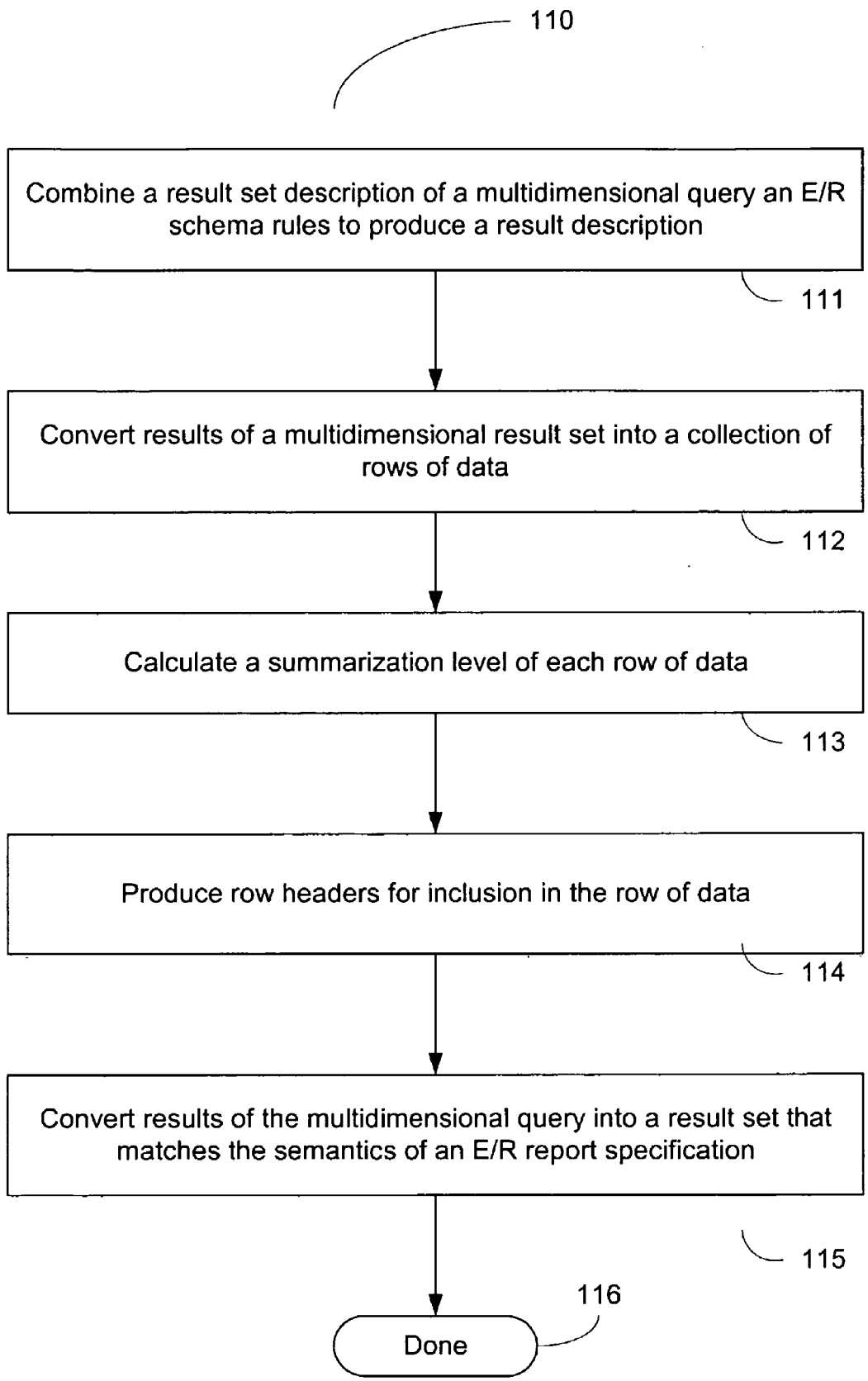
FIG. 11 shows in a flowchart an example of a method of converting a multi-dimensional dataset into a result set that reflects the semantics of an E/R report specification, in accordance with an embodiment of the result processing module.

FIG. 11 shows in a flowchart an example of a method of converting a multi-dimensional dataset into a result set that reflects the semantics of an E/R report specification (110), in accordance with the result processing module 43. The method (110) begins with combining a result set description of a multidimensional query and E/R schema rules to produce a result set description (111). The translation module 41 may provide the E/R schema rules. Next, results of the multidimensional result set are converted into a collection of rows of data (112). Next, a summarization level of each row of data is calculated (113). Next, row headers are produced for inclusion in the rows of data (114). Finally, the results of a multi-dimensional query are converted into a result set that matches the semantics of an E/R report specification (115). The method is done (116). Other steps may be added to the method (110).

Further description of concepts and examples of algorithms or methods used by the result processing module 43 are described below.

Data for tabular reports may be returned in a variety of formats, all of which return the same information. The following specification is representative of the format in which data is returned for tabular and cross-tabulated queries and forms the basis for the description of how data from multi-dimensional queries (which return data in a the cross-tabular format themselves) is converted into a representation that reflects the semantics of the original report specification.

Tabular

The data of a tabular query may be represented by a single rowset that contains zero or more rows of data, each containing 1 or more columns. In addition, each row provides:

An indication as to which grouping in the report specification a row of data pertains:

Overall report summary, indicated by 0.

Group summary. The inner (right-most) group in a report specification has the lowest number, starting at 1.

Detail (no summarization), indicated by −1.

For all summary rows, an indication of whether the row represents a header or footer value (default is footer).

Each column contains a data value and a status indicator (OK, NOT_APPLICABLE, NULL, etc.).

Cross-Tabulated

The data of a cross-tabulated query may be represented by:

A collection of metadata

One or more edges, each containing additional metadata and a single rowset

Another rowset containing cell data.

Each edge rowset contains the following columns:

A default collection of columns for each dimension that appears crossjoin'ed along the edge in the report specification. These columns are:

Member unique name

Caption

Level unique name

Level number

Parent unique name

Next member is parent (parent/child) information

Drilled, same parent as previous

Appended to the default columns of each dimension is a collection of zero or more columns, one for each dimension-specific property specified in the report specification.

Each row in the rowset has associated with an ordinal position along the edge, starting at 0.

The cell rowset contains a column containing a cell's value, and a column for each edge of the report specification, containing the ordinal position for that edge that corresponds to the cell value in each row.

If any dimension in the underlying data source is not specified in the report specification, the default member from each dimension appears in a special edge, commonly referred to as the "slicer", in an edge rowset constructed exactly the same as the other edges in the result set.

Use the metadata from query generator and the result set metadata (not data) to construct the metadata for the result set returned to the client:

Tabular Report

An array of objects describing each column of the result set, including the summarization level associated with each column.

Result set description object, the array of column descriptions.

Cross-Tabulated Report

For each dimension that appears in the report output, an object describing the columns associated with the dimension, as well as a description of the levels of the dimension present in the report output.

For each edge, an array of dimension description objects.

A result set description object containing an array of edge description objects.

Tabular Report Processing

The result set processing module, when processing tabular reports, operates upon a multi-dimensional dataset in which all non-fact dimensions are nested along a single dimension and all facts, if any, involved in the query appear along a separate edge. Overall summary values for any grouping level within the report specification appear in the result set as members with a pre-defined name known to the result set processing module. For the purposes of discussion, call it "overall value".

In the presence of non-fact attributes in a report, the tabular report-processing module traverses the non-fact edge of the multi-dimensional result set and pushes level identifiers (members) onto a stack in the manner described below. When the stack contains the same number of members as the number of levels referenced by the original report specification (upon its initial binding to the multi-dimensional metadata), a row of data is available for possible inclusion in the final result set and for calculation of its summary level.

Figure 12:
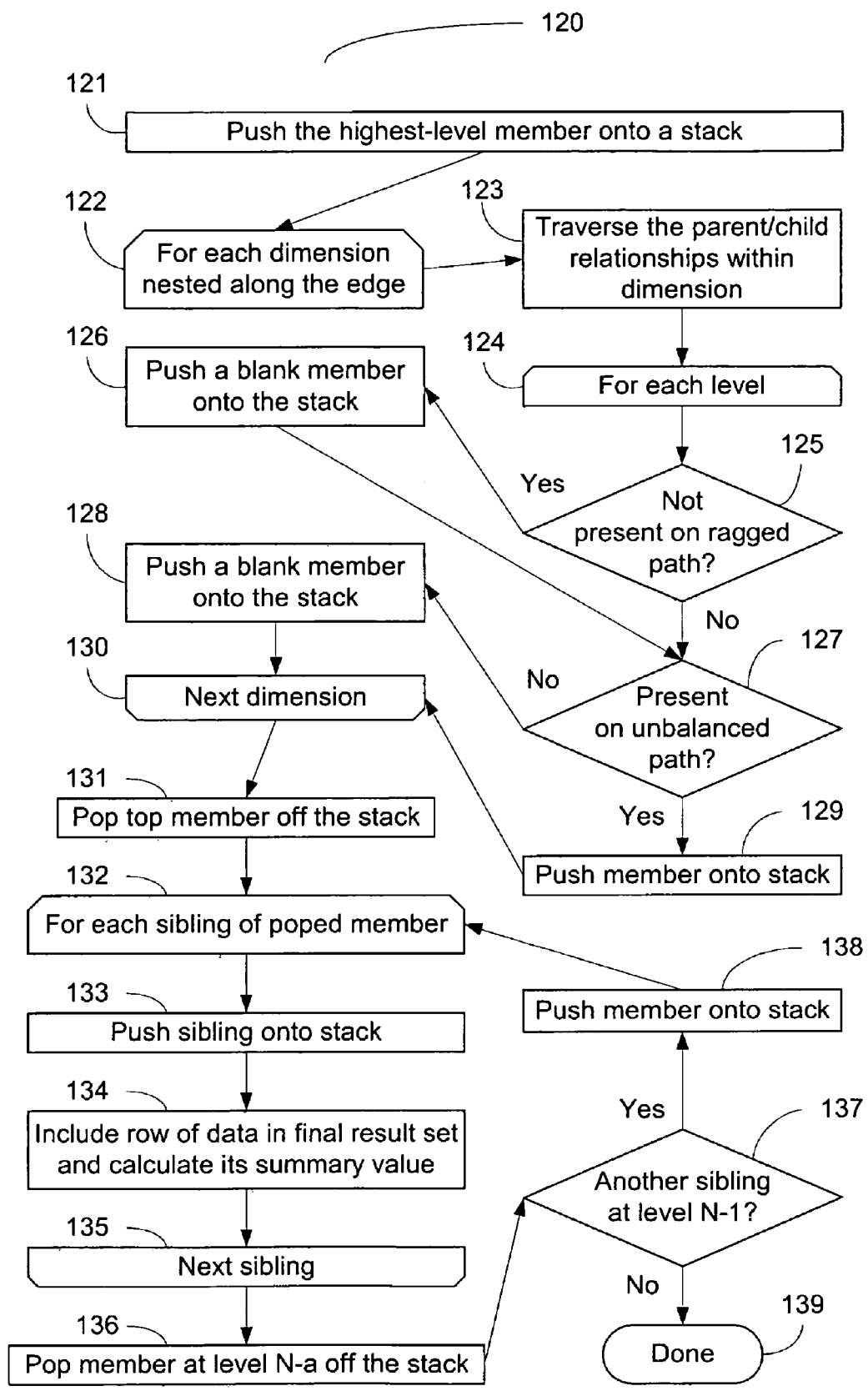
FIG. 12 shows in a flowchart an example of a method of producing a "full" stack of members representing a possible row of data, in accordance with an embodiment of the report processing module.

FIG. 12 shows in a flowchart an example of a method of producing a "full" stack of members representing a possible row of data, in accordance with an embodiment of the report processing module 43. The method (120) comprises the following steps:

1. From the current position within the multi-dimensional edge rowset, push the highest-level member onto a stack (121).
2. Traverse the parent/child relationships within a dimension along the edge (123). At each level (124), push the member at that level (which includes references to its member property values) onto the stack (129).
3. A ragged path within the hierarchy of a result set is one in which the difference in the level ordinals of a parent/descendant pair is more than expected based on the query specification.
   If a ragged path is encountered while traversing the result dataset (125), the algorithm pushes a blank member onto the stack (126) for each level from the report specification that is not present in the path.
4. An unbalanced path within the hierarchy of a result set is one in which the path does not descend to the lowest level of the dimension as specified in the report specification.
   If an unbalanced path is encountered while traversing the result dataset (127), the algorithm pushes a blank member onto the stack for each level from the report specification that is not present in the path (128).
5. Perform steps 2, 3 and 4 for each dimension nested along the edge (122) until there are no more dimensions to traverse (130).
6. When the last nested dimension has been reached (130) and its members pushed on the stack, this represents a row of data that can possibly be included in the final result set and its summary value calculated (134), as described below.
7. Pop the top member off the stack (131). If there is a sibling of the member just popped off the stack (132), push the sibling onto the stack (133) and perform step 6 (134).
8. Perform step 7 until all siblings have been processed at that level (135).
9. When all of the siblings at level N are exhausted (135), the member at level N−1 is popped of the stack (136). If there is another sibling at level N−1 (137), this member is pushed on the stack (138) and steps 6 to 8 (131 to 134) are repeated until there are no members remaining in the edge rowset.

Summary Values

Summary values for rows are calculated by the following mechanism:

Each element in the stack contains the following information:
1. Type of element (Normal, Gapped Filler, Ragged Filler, or Nested Dimension Filler).
2. State (CheckHeaderNested, CheckHeaderCurrent, CheckHeaderDone, CheckChildren, CheckNested, CheckCurrent, CheckSiblings, CheckAncestor).
3. Whether the element represents a generated overall node.

4. MDX Dimension (links with Post Processing Rules).
5. MDX Level (links with Post Processing Rules).
6. Level Ordinal (sibling number within MDX Level (5)).

Elements go through the following state sequences. The states within in braces are optional.
[CheckHeaderNested→CheckHeaderCurrent→CheckHeaderDone]→CheckChildren→CheckNested→heckCurrent[→CheckSiblings]→CheckAncestor The various CheckHeader states are not in effect if no headers are required.

CheckSiblings is not performed if CheckCurrent determines that all of the siblings would result in the same unwanted summary level.

Only the CheckHeaderCurrent and CheckCurrent states can result in the stack representing a desired row.

To determine header information and summary level, the stack is logically divided into dimensions.

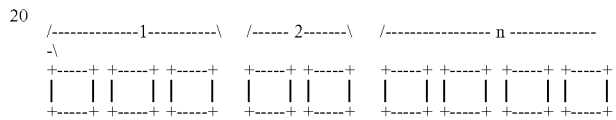

Rule 1

If there are only 'Normal' elements in the stack which match the number of columns in the report (not including generated overall nodes), it is a detail row. (Summary Level=−1).

Rule 2

If every dimension has only a single 'Normal' element, this is the overall row (Summary Level=0)

Rule 3

Determine the summarization of each dimension. A dimension is summarized if there are Nested Dimension Fillers in the dimension set.
1. The Dimension of interest is the inner-most summarized dimension prior to the first non-summarized dimension.
2. If there is a summarized dimension following a non-summarized dimension, it is a cross-joined aggregation and the stack does not represent a desired row Consider the following Stacks (Nested Dimension Fillers represented by X):

No dimensions are summarized. This is a detail row (Summery Level=−1) (by Rule 1)

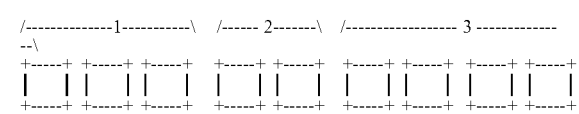

Overall Summary Level (One 'Normal' element per dimension) (by Rule 2)

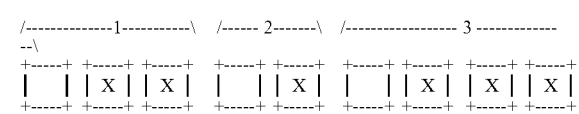

Dimension 2 is summarized (inner-most summarized dimension) (By Rule 3a)

```
/--------------1-----------\  /------ 2-------\  /------------------ 3 --------------\
+-----+ +-----+ +-----+     +-----+ +-----+     +-----+ +-----+ +-----+ +-----+
|   | |   | |   | X |       |   | |   | X |     |   | |   | |   | |   | |   |
+-----+ +-----+ +-----+     +-----+ +-----+     +-----+ +-----+ +-----+ +-----+
```

Dimension 1 is summarized, but the row doesn't represent a desired row since dimension 3 is also summarized. (By Rule 3b)

```
/--------------1-----------\  /------ 2-------\  /------------------ 3 --------------\
+-----+ +-----+ +-----+     +-----+ +-----+     +-----+ +-----+ +-----+ +-----+
|   | |   | |   | X |       |   | |   |   |     |   | |   | |   | | X | | X |
+-----+ +-----+ +-----+     +-----+ +-----+     +-----+ +-----+ +-----+ +-----+
```

Once the summarized dimension is determined, The MDX Dim and MDX Level of the inner-most non-Nested Dimension Filler within the dimension is looked up in the post-processing rules to determine the Summery Level for this column.

If the column is grouped, the stack represents a row of interest. If not, and the inner-most Non Nested Dimension Filler is a generated overall node, check the Post Processing Rules for the previous dimension.

Header Rows

Figure 13:
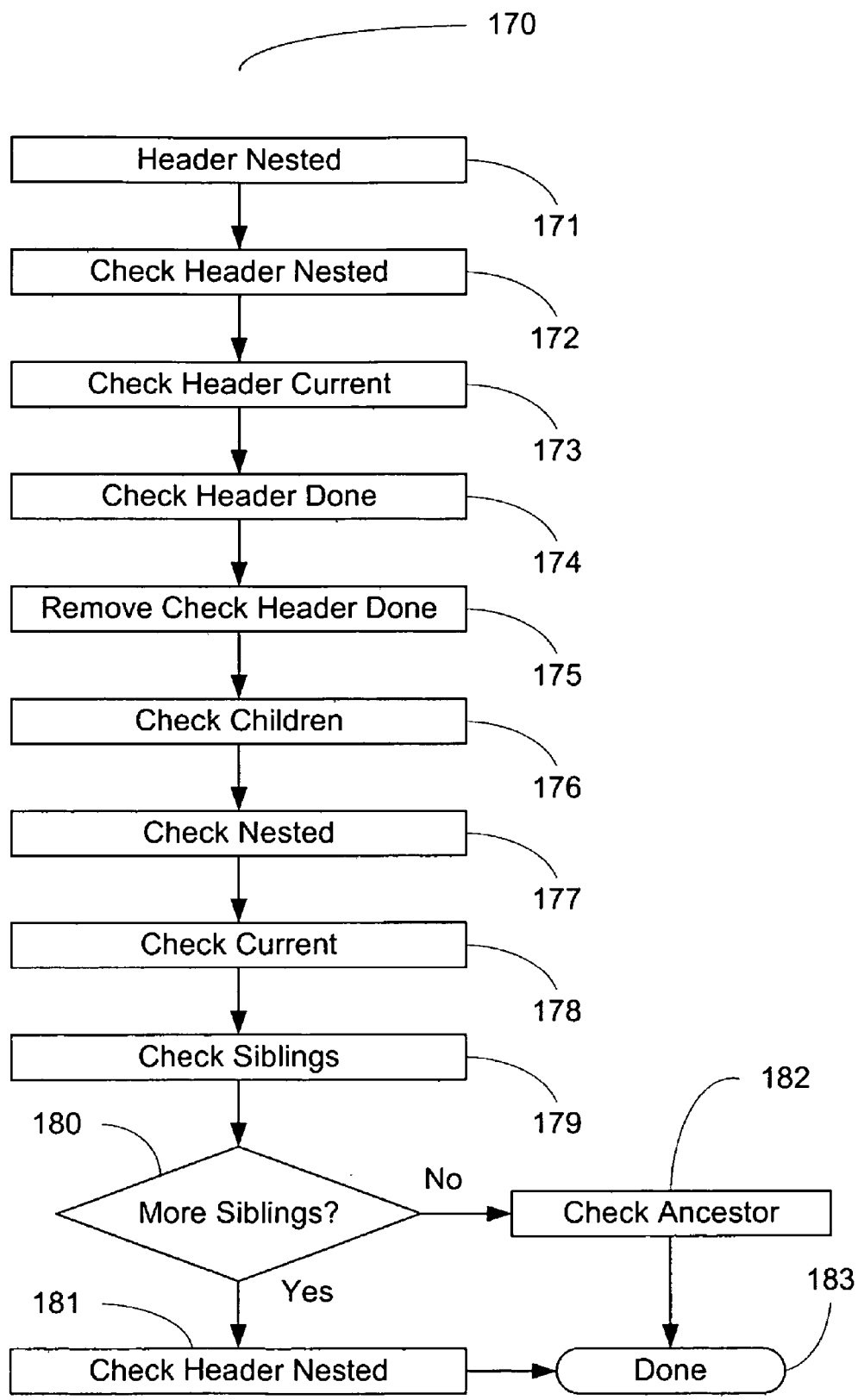
FIG. 13 shows in a flowchart an example of a method of creating header rows, in accordance with an embodiment of the result processing module.
Figure 14:
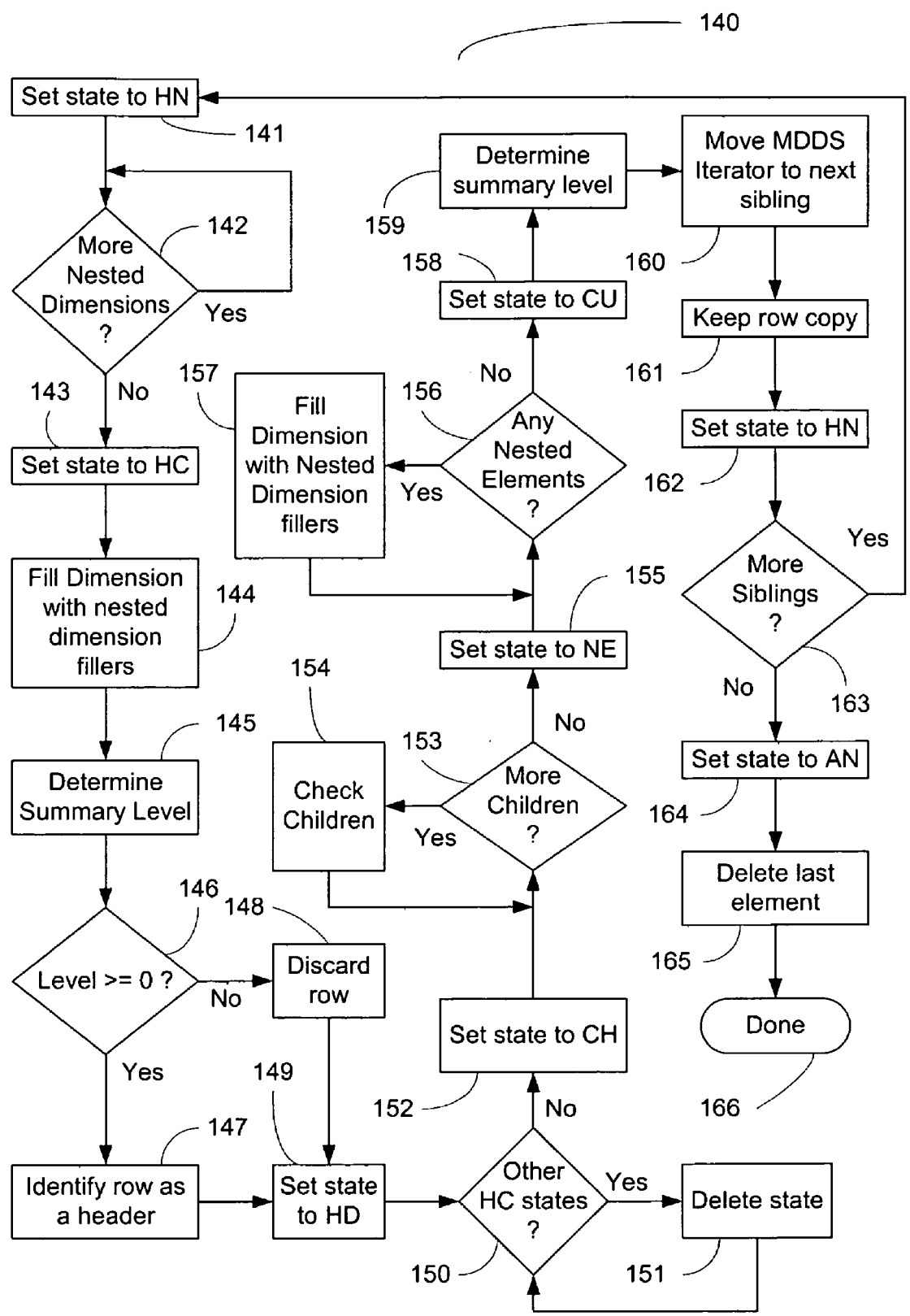
FIG. 14 shows in a flowchart another example of a method of creating header rows, in accordance with an embodiment of the result processing module.

FIGS. 13 and 14 show in flowcharts examples of a method of creating header rows (170 and 140), in accordance with an embodiment of the result processing module 43. Header rows are created by the following mechanism:

Stack states are represents as follows:
  HN
  Check Header Nested
  HC
  Check Header Current
  HD
  Check Header Done
  CH
  Check Children
  NE
  Check Nested
  CU
  Check Current
  SI
  Check Siblings
  AN
  Check Ancestor Step 1

Header Nested (171): Set the state to Header Nested (141) and check for nested dimensions (142) until there are no more.

```
       /- 1 -\
       +-----+
       | HN |
       +-----+
```

Step 2

Check Header Nested (172): Continue to check nested dimensions (142) until there are no more. Set the state to Check Header Current (143) when there is no more nested to be done. The dimension is filled with the required number of Nested Dimension Fillers (144) to ensure the dimension is 'full' before moving onto the next inner dimension.

```
/-------------- 1 --------------\       /----- 2 -----\
+-----+ +-----+ +-----+ +-----+         +-----+
| HC | |   | |   | |   | |   |          | HN |
+-----+ +-----+ +-----+ +-----+         +-----+
```

Step 3

Check Header Current (173): Determine the summary level (145) in the same manner as described below. If the summary level is >=0 (146), the row represents a header and must be identified as such (147) in the tabular result in some manner, possibly a Boolean property. Otherwise, discard row (148) and continue. Set the element state to Header Done (149).

```
/-------------- 1 --------------\       /----- 2 -----\
+-----+ +-----+ +-----+ +-----+         +-----+
| HC | |   | |   | |   | |   |          | HC |
+-----+ +-----+ +-----+ +-----+         +-----+
```

Step 4

Check Header Done (174): This state is transitory. It is only possible to move to the next state after the client has issued a Next( ) to move from the header row. It simply deletes itself (151), if there are other Check Header Current states in the stack (150) or sets the last element to Check Children (152) if not (150).

```
/-------------- 1 --------------\       /----- 2 -----\
+-----+ +-----+ +-----+ +-----+         +-----+
| HC | |   | |   | |   | |   |          | HD |
+-----+ +-----+ +-----+ +-----+         +-----+
```

Step 5

Since all Nested Dimension Fillers are removed from stack, remove this Check Header Done element (175) will cause all but the first element to remain on the stack. It's header summary level will be determined and state set to Check Children (152) when completed (See Steps 3 and 4).

```
       /- 1 -\
       +-----+
       | HC |
       +-----+
```

Step 6

Check Children (176): All children are check (154) until there are no more children (153). The state is then set to Check Nested (155). This process is repeated until the dimension is full.

```
       /- 1 -\
       +-----+
       | CH |
       +-----+
```

Step 7

Check Nested (177): Determine if there are any Nested Dimensions (156). Fill the current dimension to the required depth with Nested Dimension Fillers (157) before moving onto the inner dimension (as in Step 2).

```
       /------------- 1 -------------\
       +-----+ +-----+ +-----+ +-----+
       | NE | | NE | | NE | | NE |
       +-----+ +-----+ +-----+ +-----+
```

Step 8

Check Current (178): Once there are no more children (155) and no more nested dimensions (158), the next state is Check Current (158). Along with Check Header Current, these are the only two states that can produce a row back to the client. The summary level is determined (159), as per below. −1 indicates a detail row. 0 or above indicate a footer row. All other values indicate that this stack does not represent a desired row and the process continues.

```
       /------------- 1 -------------\    /----- 2 -----\
       +-----+ +-----+ +-----+ +-----+ +-----+ +-----+
       | NE | | NE | | NE | | NE | | NE | | CU |
       +-----+ +-----+ +-----+ +-----+ +-----+ +-----+
```

Step 9

Check Siblings (179): This is a transitory state after the Check Current (158) is completed. The underlying MDDS Iterator is moved to the next sibling (160), a row copy is kept (161), and the state is set to Check Header Nested (162). If there are no more siblings (180 and 163) the state is set to Check Ancestor (166).

```
       /------------- 1 -------------\    /----- 2 -----\
       +-----+ +-----+ +-----+ +-----+ +-----+ +-----+
       | NE | | NE | | NE | | NE | | NE | | SI |
       +-----+ +-----+ +-----+ +-----+ +-----+ +-----+
```

Step 10a (More Siblings)

Check Header Nested (181): The process starts over again at Step 1 (171 and 141).

```
       /------------- 1 -------------\    /----- 2 -----\
       +-----+ +-----+ +-----+ +-----+ +-----+ +-----+
       | NE | | NE | | NE | | NE | | NE | | HN |
       +-----+ +-----+ +-----+ +-----+ +-----+ +-----+
```

Step 10b (No More Siblings)

Check Ancestor (182): A transitory state where the last element in the stack is deleted (165). It allows triggers the end of the dataset when there are no more elements left in the stack.

```
       /------------- 1 -------------\    /----- 2 -----\
       +-----+ +-----+ +-----+ +-----+ +-----+ +-----+
       | NE | | NE | | NE | | NE | | NE | | AN |
       +-----+ +-----+ +-----+ +-----+ +-----+ +-----+
```

All Facts

If a report contains only fact columns (the "all facts" indicator is true), then the result set contains only a single row of data containing the various cell (measure) values from the multi-dimensional dataset.

There is no necessity of performing any traversal of dimension members, or the production of any summary rows.

No Facts

If a report contains no facts, it then only contains detail rows and no summary or header rows are produced. All row summary values indicate a detail row.

Multi-Dimensional Value to Column Values

Once a row of data has been identified for being appropriate for inclusion in the final result set, each member and property represented by the stack is matched, if possible, with its corresponding item in the result processing information generated by the translation module. If a matching item is found, this provides the information required to determine where an item appears in the final result set (i.e. column position).

Currently not handling 2 data source dimensions put into 1 (problem with additional summary values), nor splitting 1 into 2—missing expected summary values.

Cross Tabulated Results

In the case of a cross tabulated report, no transformations are applied to the actual data returned by the data source result set. However, it may be necessary to modify the metadata description of the result set itself so that it aligns with the semantics of the original query:

Change the names of the dimensions in the cases where:
A dimension's name is different in the report.
A single dimension is split into multiple report dimensions.
Levels from multiple dimensions are merged into a single dimension.
Change the names of levels
Change the level numbers of individual members along an edge.

The report specification system 40, translation module 41, and result processing module 43 according to the present invention, and the methods described above, may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A computer-implemented method of transforming queries based upon an entity/relationship schema into multi-dimensional expression queries, the method comprising:
matching, by operation of one or more computer processors, an object referenced in a report specification based on an entity/relationship schema to a corresponding object in the entity/relationship schema, the corresponding object adorned with associated multi-dimensional metadata;
adding the associated multi-dimensional metadata to the object referenced in the report specification;
translating the report specification into a multi-dimensional expression query;
directly retrieving all data required to populate a report output of the report specification; and
converting, by operation of the one or more computer processors, results of the multi-dimensional expression query into a result set matching semantics of the report specification, wherein converting results of the multi-dimensional expression query comprises:
converting the results of the multi-dimensional expression query into rows of data; and
producing headers for inclusion into the rows of data.

2. The computer-implemented method of claim 1, wherein converting results of the multi-dimensional query further comprises:
combining a result set description of the multi-dimensional query and rules of the entity/relationship schema to produce a final result set description.

3. The computer-implemented method of claim 1, wherein the object referenced in the report specification is generated from an entity/relationship client application.

4. The computer-implemented method of claim 1, wherein data in the report specification is stored in an OLAP format.

5. The computer-implemented method of claim 1, further comprising post-processing the retrieved data.

6. The computer-implemented method of claim 1, further comprising presenting the retrieved data in a format of an original query.

7. The computer-implemented method of claim 1, wherein translating is processed on an OLAP engine.

8. The computer-implemented method of claim 1, further comprising matching each object in the report specification to a corresponding object in the entity/relationship schema.

9. The computer-implemented method of claim 1, further comprising determining interactions of report constructs and multi-dimensional metadata precluding generation of a query.

10. A non-transitory computer-readable medium containing program code, which when executed on a processor performs an operation for transforming queries based upon an entity/relationship schema into multi-dimensional expression queries, the operation comprising:
matching an object referenced in a report specification based on an entity/relationship schema to a corresponding object in the entity/relationship schema, the corresponding object adorned with associated multi-dimensional metadata;
adding the associated multi-dimensional metadata to the object referenced in the report specification;
translating the report specification into a multi-dimensional expression query;
directly retrieving all data required to populate a report output of the report specification; and
converting results of the multi-dimensional expression query into a result set matching semantics of the report specification, wherein converting results of the multi-dimensional expression query comprises:
converting the results of the multi-dimensional expression query into rows of data; and
producing headers for inclusion into the rows of data.

11. The computer-readable medium of claim 10, wherein converting results of the multi-dimensional query further comprises:
combining a result set description of the multi-dimensional query and rules of the entity/relationship schema to produce a final result set description.

12. A system, comprising:
a processor; and
a memory storing program code, which when executed on the processor performs an operation for operation for transforming queries based upon an entity/relationship schema into multi-dimensional expression queries, the operation comprising:
matching an object referenced in a report specification based on an entity/relationship schema to a corresponding object in the entity/relationship schema, the corresponding object adorned with associated multi-dimensional metadata;
adding the associated multi-dimensional metadata to the object referenced in the report specification;
translating the report specification into a multi-dimensional expression query;
directly retrieving all data required to populate a report output of the report specification; and
converting results of the multi-dimensional expression query into a result set matching semantics of the report specification, wherein converting results of the multi-dimensional expression query comprises:
converting the results of the multi-dimensional expression query into rows of data; and
producing headers for inclusion into the rows of data.

13. The system of claim 12, wherein converting results of the multi-dimensional query further comprises:
combining a result set description of the multi-dimensional query and rules of the entity/relationship schema to produce a final result set description.

* * * * *